US012656652B2

(12) United States Patent
Mitioglu et al.

(10) Patent No.: US 12,656,652 B2
(45) Date of Patent: Jun. 16, 2026

(54) ASYMMETRIC DRIVING FOR OPTICAL MODULATOR

(71) Applicant: eLstar Dynamics Patents B.V., Rockanje (NL)

(72) Inventors: Anatolie Mitioglu, Eindhoven (NL); Anthony John Slack, Lorgues (NL)

(73) Assignee: ELSTAR DYNAMICS PATENTS B.V., Rockanje (NL)

( * ) Notice: Subject to any disclaimer, the term of this patent is extended or adjusted under 35 U.S.C. 154(b) by 0 days.

(21) Appl. No.: 18/877,916

(22) PCT Filed: Jun. 9, 2023

(86) PCT No.: PCT/EP2023/065535
§ 371 (c)(1),
(2) Date: Dec. 20, 2024

(87) PCT Pub. No.: WO2024/002660
PCT Pub. Date: Jan. 4, 2024

(65) Prior Publication Data
US 2025/0164847 A1      May 22, 2025

(30) Foreign Application Priority Data

Jun. 28, 2022      (EP) .................................... 22181537

(51) Int. Cl.
*G02F 1/167*          (2019.01)
*G02F 1/16755*       (2019.01)
*G02F 1/1676*        (2019.01)

(52) U.S. Cl.
CPC .......... *G02F 1/167* (2013.01); *G02F 1/16755* (2019.01); *G02F 1/1676* (2019.01)

(58) Field of Classification Search
CPC .... G02F 1/167; G02F 1/1676; G02F 1/16755; G02F 1/133305; G02F 1/16756;
(Continued)

(56) References Cited

U.S. PATENT DOCUMENTS 4,680,103 A      7/1987   Beilin Solomon I. et al.
5,161,048 A      11/1992  Rukavina
(Continued)

FOREIGN PATENT DOCUMENTS

CN          101002129 A      7/2007
CN          101446728 A      6/2009
(Continued)

OTHER PUBLICATIONS

International Search Report (PCT/ISA/210) issued in PCT Application No. PCT/EP2023/069486, Oct. 26, 2023, 37 pp.
(Continued)

*Primary Examiner* — Brandi N Thomas
(74) *Attorney, Agent, or Firm* — Crowell & Moring LLP

(57)          ABSTRACT
Some embodiments are directed to an electrophoretic optical modulator with asymmetric electrode driving. Electric AC signals are applied to multiple electrodes on at least two substrates to obtain an electric field between the substrates. The amplitudes of the electric AC signals are modulated causing a low-electric field region to move with respect to the electrodes.

20 Claims, 18 Drawing Sheets

(58) Field of Classification Search

CPC .............. G02F 2201/12; G02F 1/1677; G02F 2201/124; G02F 1/16762; G09G 3/344; G09G 3/3446; G09G 2300/0426; G09F 9/372; G09F 9/302; G09F 9/37; G09F 9/375; G02B 26/026; G02B 6/0066

See application file for complete search history.

(56) References Cited

U.S. PATENT DOCUMENTS

| | | | |
|---|---|---|---|
| 6,618,109 B2 | 9/2003 | Hidehira et al. | |
| 6,631,022 B1 | 10/2003 | Kihira | |
| 6,970,226 B2 | 11/2005 | Yu et al. | |
| 7,116,466 B2 * | 10/2006 | Whitesides | G02F 1/16756 |
| | | | 345/107 |
| 7,177,002 B2 | 2/2007 | Matsumoto et al. | |
| 7,362,400 B2 | 4/2008 | Itou et al. | |
| 8,018,430 B2 | 9/2011 | Choi et al. | |
| 8,054,535 B2 | 11/2011 | Sikharulidze et al. | |
| 8,384,658 B2 | 2/2013 | Albert et al. | |
| 8,384,659 B2 | 2/2013 | Yeo et al. | |
| 8,446,663 B2 | 5/2013 | Kim et al. | |
| 8,514,481 B2 | 8/2013 | Yeo et al. | |
| 8,520,286 B2 | 8/2013 | Clapp et al. | |
| 8,950,162 B2 | 2/2015 | Miller et al. | |
| 9,013,780 B2 | 4/2015 | Henzen et al. | |
| 9,075,281 B2 | 7/2015 | Kato et al. | |
| 9,176,347 B2 | 11/2015 | Peng et al. | |
| 9,201,282 B2 | 12/2015 | Henzen | |
| 9,361,836 B1 | 6/2016 | Telfer et al. | |
| 10,921,678 B2 | 2/2021 | van de Kamer | |
| 11,030,969 B2 | 6/2021 | Sainis et al. | |
| 11,095,040 B2 | 8/2021 | Sonoda | |
| 11,099,451 B1 | 8/2021 | Massard | |
| 2004/0036944 A1 | 2/2004 | Tsu | |
| 2004/0057005 A1 | 3/2004 | Matsumoto et al. | |
| 2004/0145696 A1 * | 7/2004 | Oue | G02F 1/1679 |
| | | | 349/167 |
| 2005/0185104 A1 | 8/2005 | Weisbuch et al. | |
| 2005/0213191 A1 * | 9/2005 | Whitesides | G02F 1/1677 |
| | | | 359/296 |
| 2005/0237897 A1 | 10/2005 | Takaki et al. | |
| 2007/0046621 A1 | 3/2007 | Suwabe et al. | |
| 2007/0291808 A1 | 12/2007 | Ledentsov | |
| 2009/0040192 A1 | 2/2009 | Haga | |
| 2009/0321265 A1 | 12/2009 | Stancovski | |
| 2010/0321346 A1 | 12/2010 | Chae et al. | |
| 2011/0102881 A1 | 5/2011 | Verschueren et al. | |
| 2011/0205616 A1 | 8/2011 | Mueller et al. | |
| 2011/0249933 A1 | 10/2011 | Nair | |
| 2011/0261432 A1 | 10/2011 | Yamazaki | |
| 2011/0290649 A1 * | 12/2011 | Hamada | B03C 5/026 |
| | | | 204/547 |
| 2011/0304529 A1 | 12/2011 | Yeo et al. | |
| 2012/0024375 A1 | 2/2012 | Mader | |
| 2012/0068990 A1 | 3/2012 | Moriyama et al. | |
| 2012/0087389 A1 | 4/2012 | Howe | |
| 2012/0090976 A1 | 4/2012 | Kobayashi et al. | |
| 2013/0016420 A1 | 1/2013 | Yeo et al. | |
| 2013/0271811 A1 | 10/2013 | Lam et al. | |
| 2014/0061049 A1 | 3/2014 | Lo | |
| 2014/0104155 A1 | 4/2014 | Long | |
| 2014/0160412 A1 | 6/2014 | Peng et al. | |
| 2015/0268593 A1 | 9/2015 | Sasaki et al. | |
| 2016/0004368 A1 | 1/2016 | Kurasawa | |
| 2016/0071465 A1 | 3/2016 | Hung et al. | |
| 2016/0161780 A1 | 6/2016 | Van Oosten et al. | |
| 2016/0187755 A1 | 6/2016 | Kasegawa | |
| 2017/0061895 A1 | 3/2017 | Paolini, Jr. et al. | |
| 2017/0107753 A1 | 4/2017 | Koga et al. | |
| 2017/0301273 A1 | 10/2017 | Atkinson et al. | |
| 2018/0116712 A1 | 5/2018 | Dong et al. | |
| 2018/0239211 A1 | 8/2018 | Teranishi et al. | |
| 2018/0247598 A1 | 8/2018 | Sainis | |
| 2019/0302564 A1 | 10/2019 | van de Kamer | |
| 2019/0324343 A1 | 10/2019 | Atkinson et al. | |
| 2020/0066924 A1 * | 2/2020 | Tombs | H10F 19/80 |
| 2020/0249538 A1 * | 8/2020 | Massard | G02F 1/1676 |
| 2020/0249539 A1 | 8/2020 | Massard | |
| 2020/0320921 A1 * | 10/2020 | Lin | G02F 1/1685 |
| 2020/0347666 A1 | 11/2020 | Kim et al. | |
| 2020/0355975 A1 | 11/2020 | Vivier | |
| 2021/0055321 A1 | 2/2021 | deKoninck et al. | |
| 2021/0055621 A1 | 2/2021 | Massard | |
| 2021/0058122 A1 | 2/2021 | Shinkawa | |
| 2021/0141259 A1 | 5/2021 | Yoshino | |
| 2021/0149265 A1 | 5/2021 | Bergh et al. | |
| 2021/0181594 A1 | 6/2021 | Jain et al. | |
| 2021/0312846 A1 | 10/2021 | Atkinson et al. | |
| 2021/0373392 A1 | 12/2021 | Nie et al. | |
| 2022/0035222 A1 | 2/2022 | Massard et al. | |
| 2022/0365382 A1 | 11/2022 | Komitov et al. | |
| 2023/0194946 A1 | 6/2023 | Neyts et al. | |
| 2024/0069403 A1 | 2/2024 | Lu et al. | |
| 2025/0258416 A1 | 8/2025 | Slack | |

FOREIGN PATENT DOCUMENTS

| | | | | |
|---|---|---|---|---|
| CN | 101675379 | | 3/2010 | |
| CN | 102187271 A | | 9/2011 | |
| CN | 102314038 A | | 1/2012 | |
| CN | 102597864 A | | 7/2012 | |
| CN | 102668015 A | | 9/2012 | |
| CN | 102725683 A | | 10/2012 | |
| CN | 106104368 A | | 11/2016 | |
| CN | 106573835 A | | 4/2017 | |
| CN | 107924100 A | | 4/2018 | |
| CN | 109463008 A | | 3/2019 | |
| CN | 110612477 | | 12/2019 | |
| CN | 111739969 A | | 10/2020 | |
| CN | 112 162 419 A | | 1/2021 | |
| CN | 113534507 | | 10/2021 | |
| CN | 113574450 A | | 10/2021 | |
| CN | 113 655 557 A | | 11/2021 | |
| CN | 113631998 A | | 11/2021 | |
| CN | 113677548 A | | 11/2021 | |
| CN | 113966430 A | | 1/2022 | |
| CN | 114270249 A | | 4/2022 | |
| CN | 114609840 | | 6/2022 | |
| CN | 115145084 A | | 10/2022 | |
| CN | 115 857 211 A | | 3/2023 | |
| CN | 111142306 B | | 5/2023 | |
| CN | 119 895 325 A | | 4/2025 | |
| EP | 2 555 049 A2 | | 2/2013 | |
| EP | 3 381 081 B1 | | 4/2021 | |
| EP | 4 390 522 A1 | | 6/2024 | |
| EP | 4 288 833 B1 | | 7/2024 | |
| FR | 2842916 A1 | | 1/2004 | |
| JP | S49 29995 A | | 3/1974 | |
| JP | H8-211422 A | | 8/1996 | |
| JP | 11021149 A | | 1/1999 | |
| JP | 2001083538 A | | 3/2001 | |
| JP | 2004-70163 A | | 3/2004 | |
| JP | 2005-91442 A | | 4/2005 | |
| JP | 2005-242320 | | 9/2005 | |
| JP | 2005265921 A | | 9/2005 | |
| JP | 2006-195049 A | | 7/2006 | |
| JP | 2007017735 A | | 1/2007 | |
| JP | 2008500592 A | | 1/2008 | |
| JP | 2008-209953 A | | 9/2008 | |
| JP | 2009020831 | * | 1/2009 | G06F 3/041 |
| JP | 2009-80380 A | | 4/2009 | |
| JP | 2009080288 A | | 4/2009 | |
| JP | 2011165893 A | | 8/2011 | |
| JP | 2012-063701 A | | 3/2012 | |
| JP | 2012203409 A | | 10/2012 | |
| JP | 2013-7985 A | | 1/2013 | |
| JP | 2014-35385 A | | 2/2014 | |
| JP | 2017122846 A | | 7/2017 | |
| JP | 2002311461 A | | 10/2022 | |
| KR | 10-2010-0135442 A | | 12/2010 | |
| KR | 101 067 174 B1 | | 9/2011 | |
| KR | 20140099421 | | 8/2014 | |
| KR | 20190050722 A | | 5/2019 | |

(56) References Cited

FOREIGN PATENT DOCUMENTS

| | | | |
|---|---|---|---|
| TW | 201740609 | A | 11/2017 |
| TW | 202045998 | A | 12/2020 |
| TW | 202219615 | A | 5/2022 |
| TW | 202225790 | A | 7/2022 |
| TW | 202314334 | A | 4/2023 |
| WO | WO 2002/08826 | A1 | 6/2002 |
| WO | WO 2003/100758 | A1 | 12/2003 |
| WO | WO 2004/008423 | A1 | 1/2004 |
| WO | WO 2004/012000 | A1 | 2/2004 |
| WO | WO 2004/086389 | A | 10/2004 |
| WO | WO 2008/012934 | A1 | 1/2008 |
| WO | WO 2011/012499 | A1 | 2/2011 |
| WO | WO 2011/131689 | A1 | 10/2011 |
| WO | WO 2014/191233 | A1 | 6/2014 |
| WO | WO 2014/209119 | A2 | 12/2014 |
| WO | WO 2015/141740 | A1 | 9/2015 |
| WO | WO2015136458 | A1 | 9/2015 |
| WO | WO 2017/026480 | A1 | 2/2017 |
| WO | WO 2017/192881 | A1 | 11/2017 |
| WO | WO 2018/204582 | A1 | 11/2018 |
| WO | WO 2020/161005 | A1 | 8/2020 |
| WO | WO 2021/138344 | A1 | 7/2021 |
| WO | WO 2021/228907 | A1 | 11/2021 |
| WO | WO 2022/023180 | A1 | 2/2022 |
| WO | WO 2022/029018 | A | 2/2022 |
| WO | WO 2022/053423 | A1 | 3/2022 |
| WO | WO 2022/246430 | A1 | 11/2022 |
| WO | WO 2023/117191 | A1 | 6/2023 |
| WO | WO 2024/002660 | A1 | 1/2024 |
| WO | WO 2024/033009 | A1 | 2/2024 |

OTHER PUBLICATIONS

Office Action issue in Chinese Patent Application No. 202280053722.6 dated Oct. 10, 2024, w/English translation, 10 pages.

Office Action issue in Korean Patent Application No. 10-2024-7024654 dated Sep. 27, 2024, w/English translation, 15 pages.

Abdelraouf et al. "Recent Advances in Tunable Metasurfaces: Materials, Design and Applications," ACS Nano, vol. 16, No. 9 (2022) pp. 13339-13369.

Aieta et al. "Supplementary Materials for Multiwavelength Achromatic Metasurfaces by Dispersive Phase Compensation," Science, vol. 347, No. 6228, (2015) pp. 1342-1345.

C. Qiu et al., "Transparent Ferroelectric Crystals with Ultrahigh Piezoelectricity," Nature, 577 (2020) pp. 350-367.

California et al. "Silver grid electrodes for faster switching ITO free electrochromic devices," Solar Energy Materials & Solar Cells, vol. 153 (2016), pp. 61-67.

Chen et al. "Flat optics with dispersion-engineered metasurfaces," Nature Reviews Materials, vol. 5 (2020), pp. 604-620.

Final Office Action from U.S. Appl. No. 17/087,063, dated Jun. 1, 2023, pp. 1-26.

Final Office Action from U.S. Appl. No. 17/383,831, dated Feb. 28, 2023, pp. 1-16.

Office Action from U.S. Appl. No. 17/383,831, dated Oct. 3, 2022, pp. 1-24.

Office Action from U.S. Appl. No. 17/398,239, dated Feb. 28, 2023, pp. 1-26.

Devlin et al. "High efficiency dielectric metasurfaces at visible wavelengths," eprint arXiv:1603.02735 (2016) pp. 1-18.

Extended European Search Report from European Application No. 22215020.3-1207, May 30, 2023, 9 pp.

Fan, "Freeform Metasurface Design Based on Topology Optimization," MRS Bulletin, vol. 45, (2020), pp. 196-201.

Final Office Action, issued in U.S. Appl. No. 16/834,588, dated Oct. 15, 2020, pp. 1-33, U.S. Patent and Trademark Office, Alexandria, VA.

Hu et al. "Efficient full-path optical calculation of scalar and vector diffraction using the Bluestein method," Light: Science & Applications, vol. 9, issue 119 (2020) pp. 1-11.

International Preliminary Report on Patentability from International Application No. PCT/EP2022/080773, Jan. 3, 2024, 22 pp.

International Search Report and Written Opinion for PCT/EP2020/052379 mailed Mar. 25, 2020.

International Search Report and Written Opinion from International Application No. PCT/EP2022/080773, May 11, 2023, 30 pp.

International Search Report and Written Opinion from International Application No. PCT/EP2021/071346, Nov. 3, 2021, 15 pp.

International Search Report and Written Opinion from International Application No. PCT/EP2023/065535, Sep. 1, 2023, 15 pp.

International Search Report and Written Opinion from International Application No. PCT/EP2022/056315, Jun. 7, 2022, 15 pp.

Kim et al. "Non-uniform sampling and wide range angular spectrum method," J. Opt. vol. 16 (2014) pp. 125710-1 to 125710-9.

Leutenegger et al. "Fast focfield calculations," Optics Express, vol. 14, No. 23 (2006), pp. 11277-11290.

Li et al. "Large-area metasurface on CMOS-compatible fabrication platform: driving flat optics from lab to fab," Nanophotonics, vol. 9, issue 10 (2020) pp. 3071-3087.

Maniscalco et al., "Thin film thickness measurements using Scanning White Light Interferometry," Thin Solid Films, 550 (2014) pp. 10-16.

Murray et al. "Numerical comparison of grid pattern diffraction effects through measurement and modeling with OptiScan software," Proc. of SPIE, vol. 8016 (2011) pp. 1-15.

Nie et al. Broadband Light Bending with Plasmonic Nanoantennas, Science, vol. 335 (2016), pp. 427-428.

Nockert, "AI for Game Programming 2: Maze Generation (A3.6)," (Jan. 8, 2020) pp. 1-12.

Non-Final Office Action, issued in U.S. Appl. No. 16/778,002, dated Jun. 19, 2020, pp. 1-20, U.S. Patent and Trademark Office, Alexandria, VA.

Non-Final Office Action, issued in U.S. Appl. No. 16/834,588, dated Aug. 3, 2020, pp. 1-43, U.S. Patent and Trademark Office, Alexandria, VA.

Non-Final Office Action, issued in U.S. Appl. No. 16/983,729, dated Apr. 26, 2021, pp. 1-20, U.S. Patent and Trademark Office, Alexandria, VA.

Non-Final Office Action, issued in U.S. Appl. No. 17/087,063, dated Sep. 14, 2022, pp. 1-31, U.S. Patent and Trademark Office, Alexandria, VA.

Notice of Allowance, issued in U.S. Appl. No. 16/778,002, dated Aug. 3, 2020, pp. 1-9, U.S. Patent and Trademark Office, Alexandria, VA.

Notice of Allowance, issued in U.S. Appl. No. 16/834,588, dated Dec. 14, 2020, pp. 1-10, U.S. Patent and Trademark Office, Alexandria, VA.

Notice of Allowance, issued in U.S. Appl. No. 16/944,918, dated May 15, 2021, pp. 1-10, U.S. Patent and Trademark Office, Alexandria, VA.

Notice of Reasons for Refusal and English translation from JP2021-545949, dated Sep. 12, 2023, pp. 1-11.

Partial European Search Report from European application No. 23205397.5-1020, Mar. 22, 2024, 16 pp.

Skyum, "A Sweepline Algorithm for Generalized, Delaunay Triangulations," DAIMI Report Series, vol. 20, issue 373 (1991) pp. 1-21.

Tao et al. "Reversible Metal Electrodeposition Devices: An Emerging Approach to Effective Light Modulation and Thermal Management," Adv. Optical Mater. vol. 9 (2021) pp. 2001847-1 to 2001847-15.

Toskov et al. "Modeling and fabrication of Pt micro-heaters built on alumina Substrate," Proceedings of the 36th International Spring Seminar on Electronics Technology (2013), pp. 1-7.

Turing, "The Chemical Basis of Morphogenesis," Philosophical Transactions of the Royal Society of London. Series B, Biological Sciences, vol. 237, No. 641 (1952), pp. 37-72.

Yonghe et al. "A Simple Sweep-line Delaunay Triangulation Algorithm," Journal of Algorithms and Optimization, vol. 1, Iss. 1 (2013) pp. 30-38.

Partial European Search Report from European application No. 23217588, Jun. 17, 2024, 10 pp.

(56) References Cited

OTHER PUBLICATIONS

International Search Report and Written Opinion from PCT/EP2023/065535, Jun. 28, 2022, 15 pp.
Chinese Search Report and Office Action from Chinese application No. 2022800340665, Jul. 30, 2024, 5 pgs.
Extended European Search Report from European application No. 24166202.2, Oct. 10, 2024, 31 pgs.
International Preliminary Report on Patentability from PCT/EP2023/065535, Oct. 15, 2024, 15 pp.
Extended European Search Report from European Application No. 24197047.4, Dec. 5, 2024, 22 pp.
Extended European Search Report from European Application No. 241869486, Dec. 17, 2024, 8 pp.
Extended European Search Report from EP 24177302, Dec. 23, 2024, 19 pp.
Chinese Office Action and English Translation from CN 2022800852983, Nov. 15, 2024, 6 pp.
Extended European Search Report issued in European Application No. 24205495.5 dated Apr. 28, 2025 (12 pages).
Extended European Search Report issued in European Application No. 24215365.8 dated May 8, 2025 (9 pages).
International Search Report (PCT/ISA/210) and Written Opinion issued in PCT Application No. PCT/EP2025/052112 dated Apr. 28, 2025 (13 pages).
International Search Report (PCT/ISA/210) and Written Opinion issued in PCT Application No. PCT/EP2025/052114 dated Apr. 28, 2025 (13 pages).
Japanese-language Office Action issued in Japanese Application No. 2023-555554 dated Mar. 25, 2025 with English translation (7 pages).
International Search Report and Written Opinion from international application No. PCT/EP2025/058134, Jul. 4, 2025, 18 pgs.
Chinese Office Action and translation from CN Appl. No. 202380050094.0, May 24, 2025, 5 pgs.
US Office Action from U.S. Appl. No. 19/102,284, filed Jun. 27, 2025, 12 pgs.
International Search Report (PCT/ISA/210) and Written Opinion issued in PCT Application No. PCT/EP2023/085381 dated Feb. 26, 2024 (16 pages).
Kotova, S. P. et al., "Technology and electro-optical properties of modal liquid crystal wavefront correctors," *J. Opt. A: Pure Appl. Opt.* 5, 5 (2003) pp. S231-S238.
"An Overview of Metasurface Fabrication," https://planopsim.com/fabrication/an-overview-of-metasurface-fabrication/, accessed Sep. 9, 2022.
Japanese Office Action and translation from JP Appl. No. 2023-555554, Jun. 27, 2025, 3 pgs.
English translation of Chinese Office Action from CN 202180063551.0, Jul. 30, 2025, 10 pgs.
Chinese Office Action and English translation from CN 202380064549.4, Aug. 13, 2025, 17 pgs.
Japanese Notice of Reasons for Rejection and English translation from JP 2024-575753, Jul. 22, 2025, 9 pgs.
Ghaemi et al., Surface Plasmons Enhance Optical Transmission Through Subwavelength Holes, *Physical Review B*, vol. 58, No. 1, 1998, pp. 6779-6782.
Ebbesen et al., Extraordinary Optical Transmission Through Sub-Wavelength Hole Arrays, *Nature*, vol. 391, 1998, pp. 667-669.
Felzenszwalb et al., Distance Transforms of Sampled Functions, *Theory of Computing*, vol. 8, 2012, pp. 415-428.
International Search Report and Written Opinion issued in PCT Application No. PCT/EP2024/059853 dated Jun. 13, 2024, 8 pgs.
International Search Report and Written Opinion from International Application No. PCT/EP2024/059851, Jul. 2, 2024, 14 pgs.
Chinese Office Action and English translation from CN 202510163029X, dated Sep. 23, 2025, 12 pgs.
Jones, Liquid Crystal Displays, in: J.P. Dakin and R.G.W. Brown, (eds.) *Handbook of Optoelectronics:Enabling Technologies. Series in Optics and Optoelectronics 2*, CRC Press, Boca Raton, FL, 2017, pp. 1-98.
Eames, Vacuum Glazing: Current Performance and Future Prospects, *Vacuum*, 82, 2008, pp. 717-722.
Payami et al., Hybrid Beamforming for Large Antenna Arrays with Phase Shifter Selection, *IEEE Transactions on Wireless Communications*, 15, 11, 2016, pp. 1-20.
Extended European Search Report from EP 25175705, Nov. 13, 2025, 13 pgs.
Taiwanese Office Action and English translation from TW 111122137, Dec. 29, 2025, 6 pgs.
Chinese Language Office Action and English Translation from CN 202510163029.X, dated Mar. 21, 2026, 20 pgs.
Chinese Language Office Action and English Translation from CN 202480037192.5, dated Mar. 26, 2026, 8 pgs.
Japanese Language Office Action Notice of Reasons for Rejection and English Translation from JP2025-559595, dated Feb. 26, 2026, 10 pgs.
Japanese Notice of Reasons for Rejection and English Translation from JP 2025-043261, Feb. 3, 2026, 8 pgs.
Japanese Notice of Reasons for Rejection and English Translation from JP 2025-536253, Dec. 24, 2025, 8 pgs.
Taiwanese Office Action and English translation from TW114119008, Mar. 2, 2026, 24 pgs.
Taiwanese Office Action and English translation from TW114129602, Dec. 15, 2025, 25 pgs.
International Search Report and Written Opinion from International Application No. PCT/EP2025/078762, Feb. 6, 2026, 20 pgs.

* cited by examiner

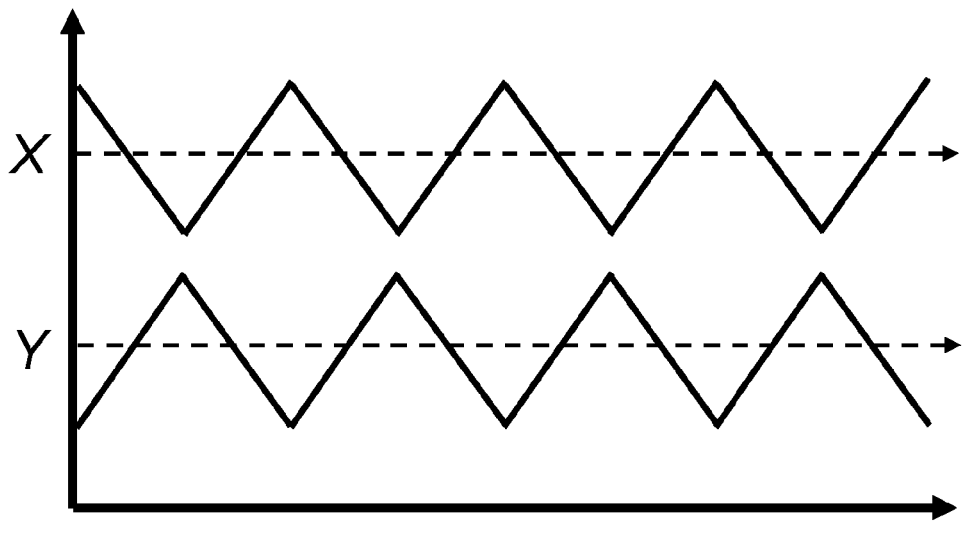
*Fig. 1c.1*
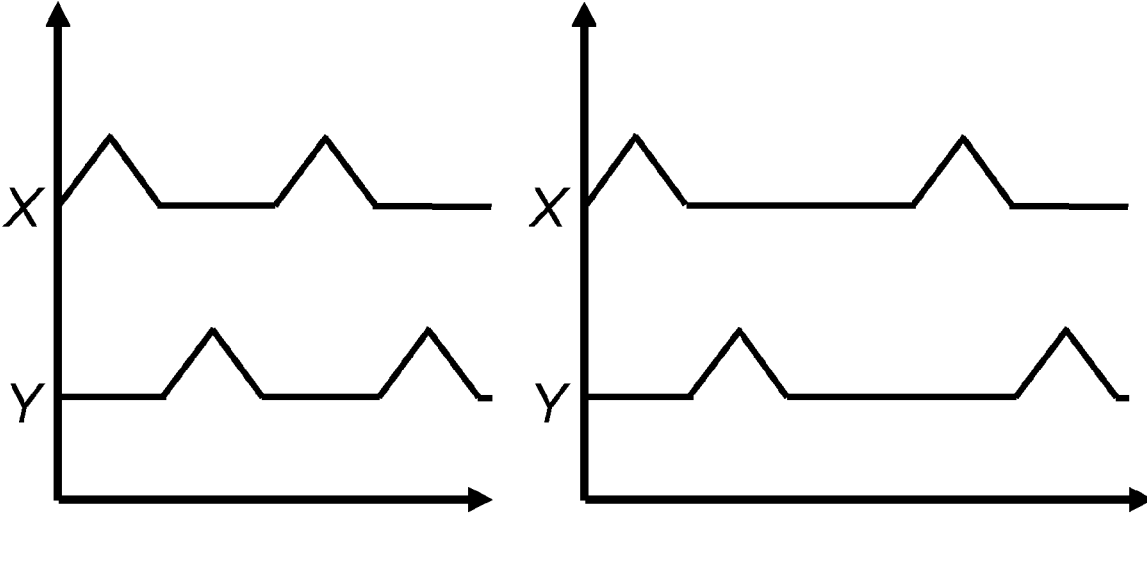
*Fig. 1c.2*          *Fig. 1c.3*

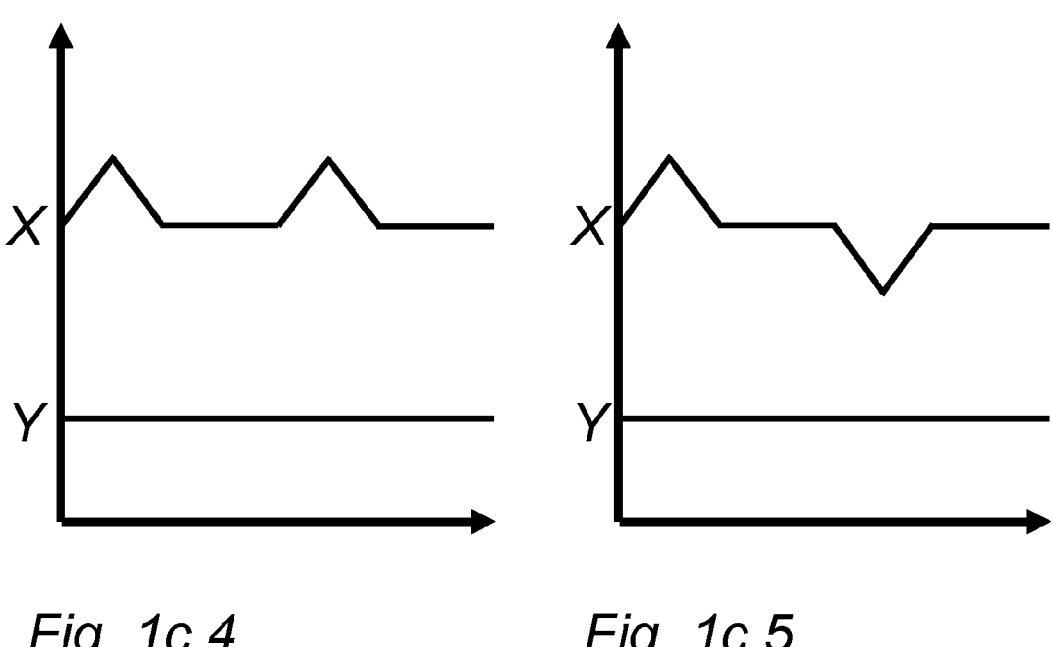
*Fig. 1c.4*            *Fig. 1c.5*

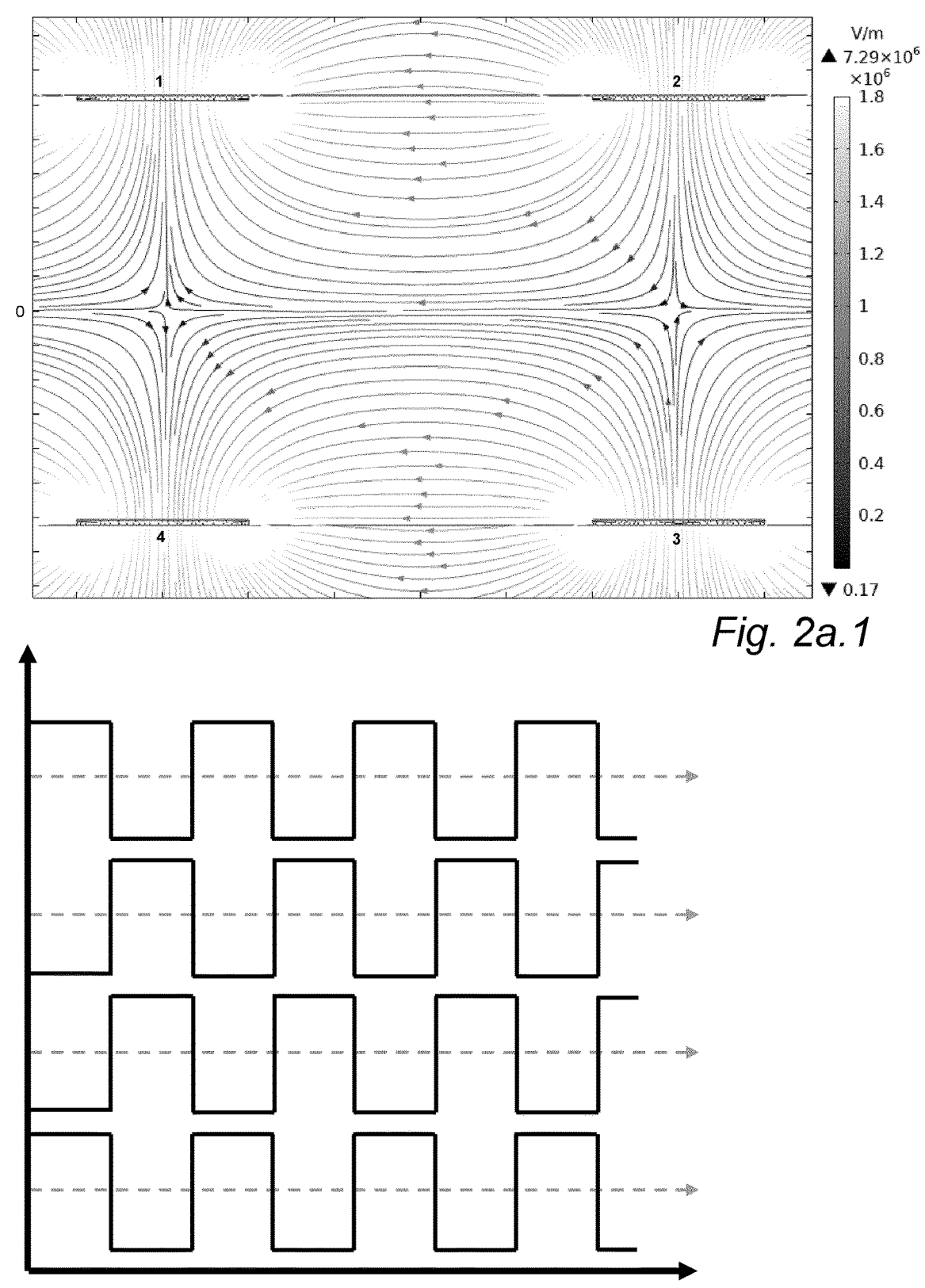
*Fig. 2a.1*
*Fig. 2a.2*

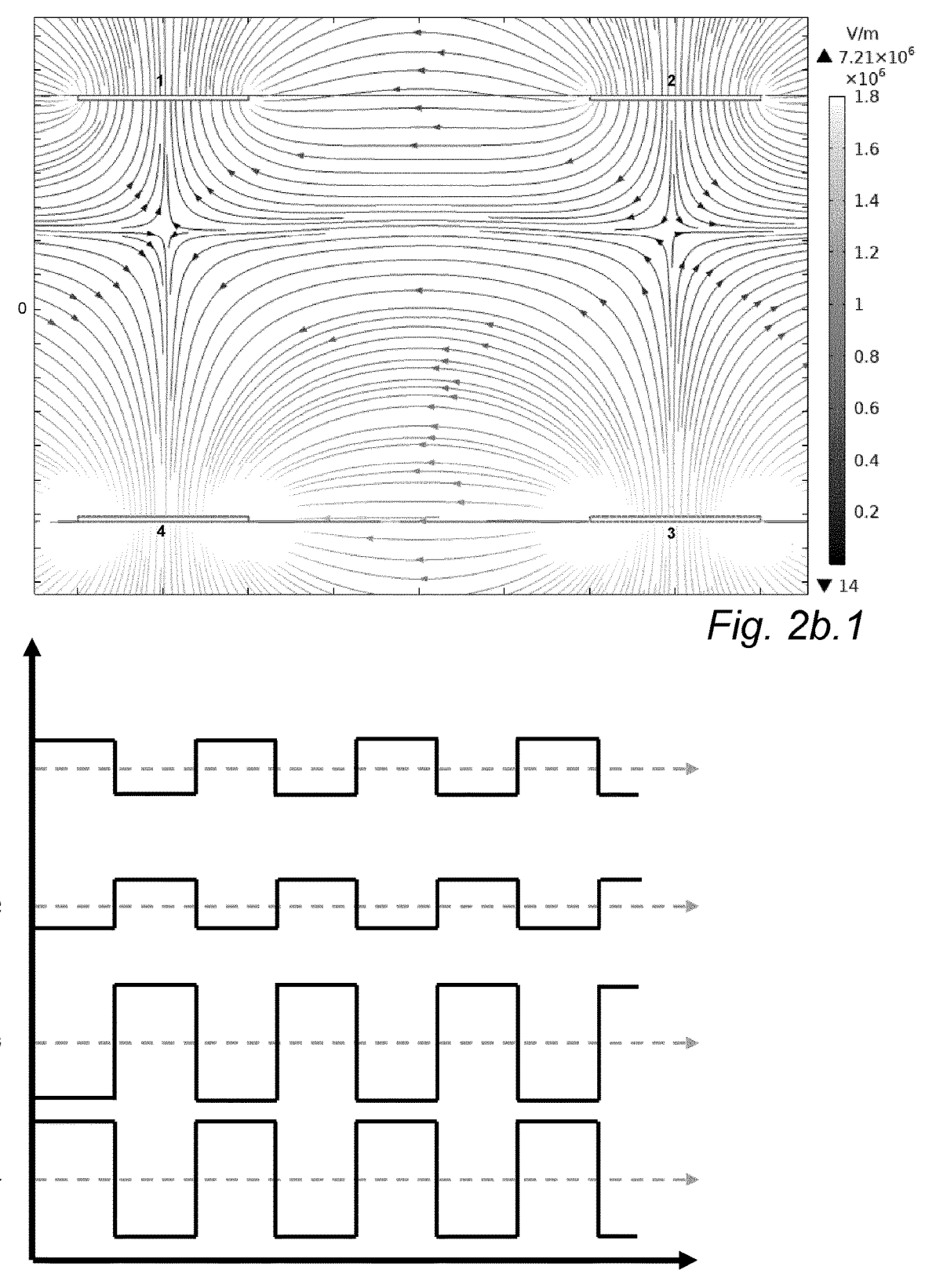
*Fig. 2b.1*
*Fig. 2b.2*

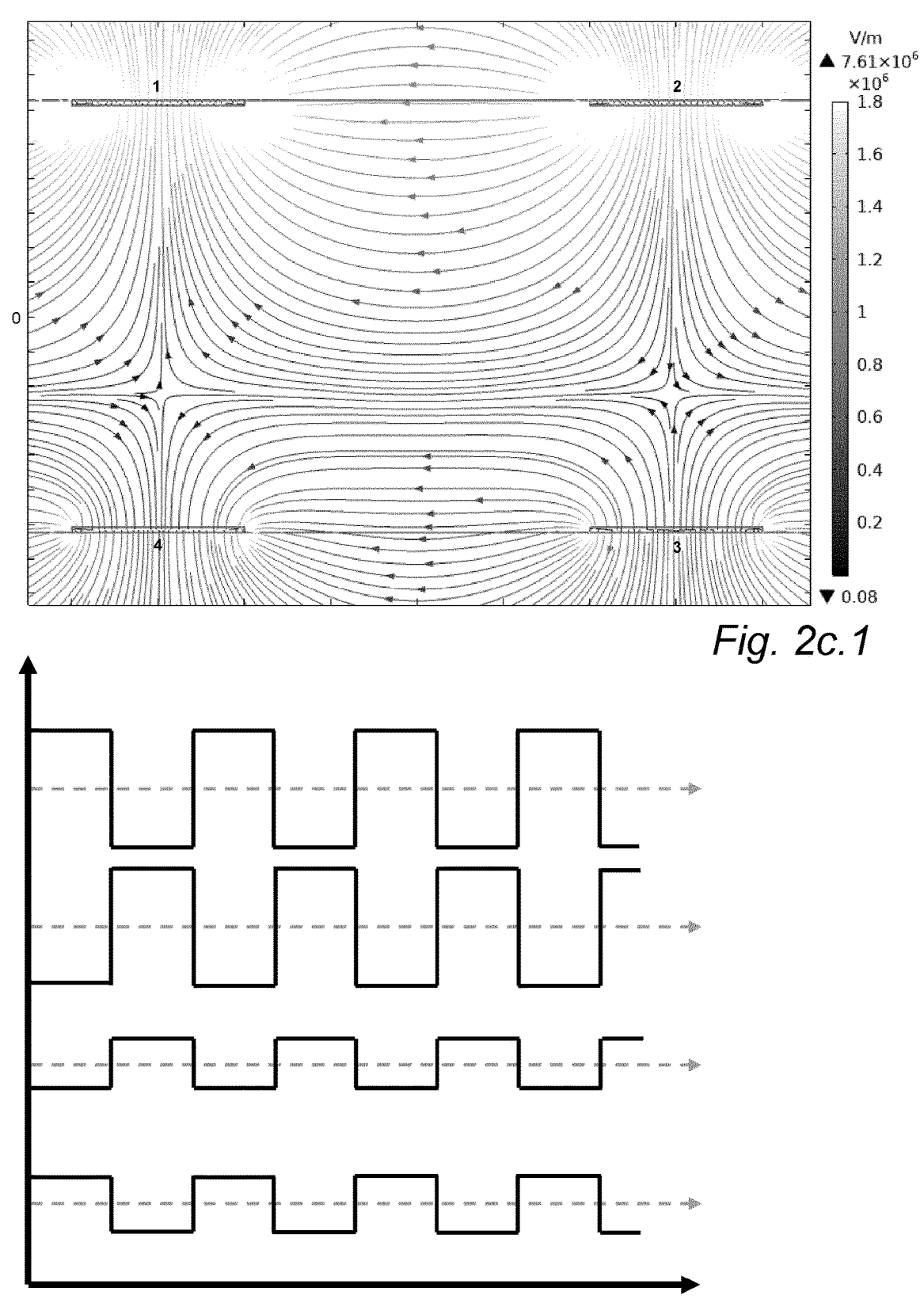
*Fig. 2c.1*
*Fig. 2c.2*

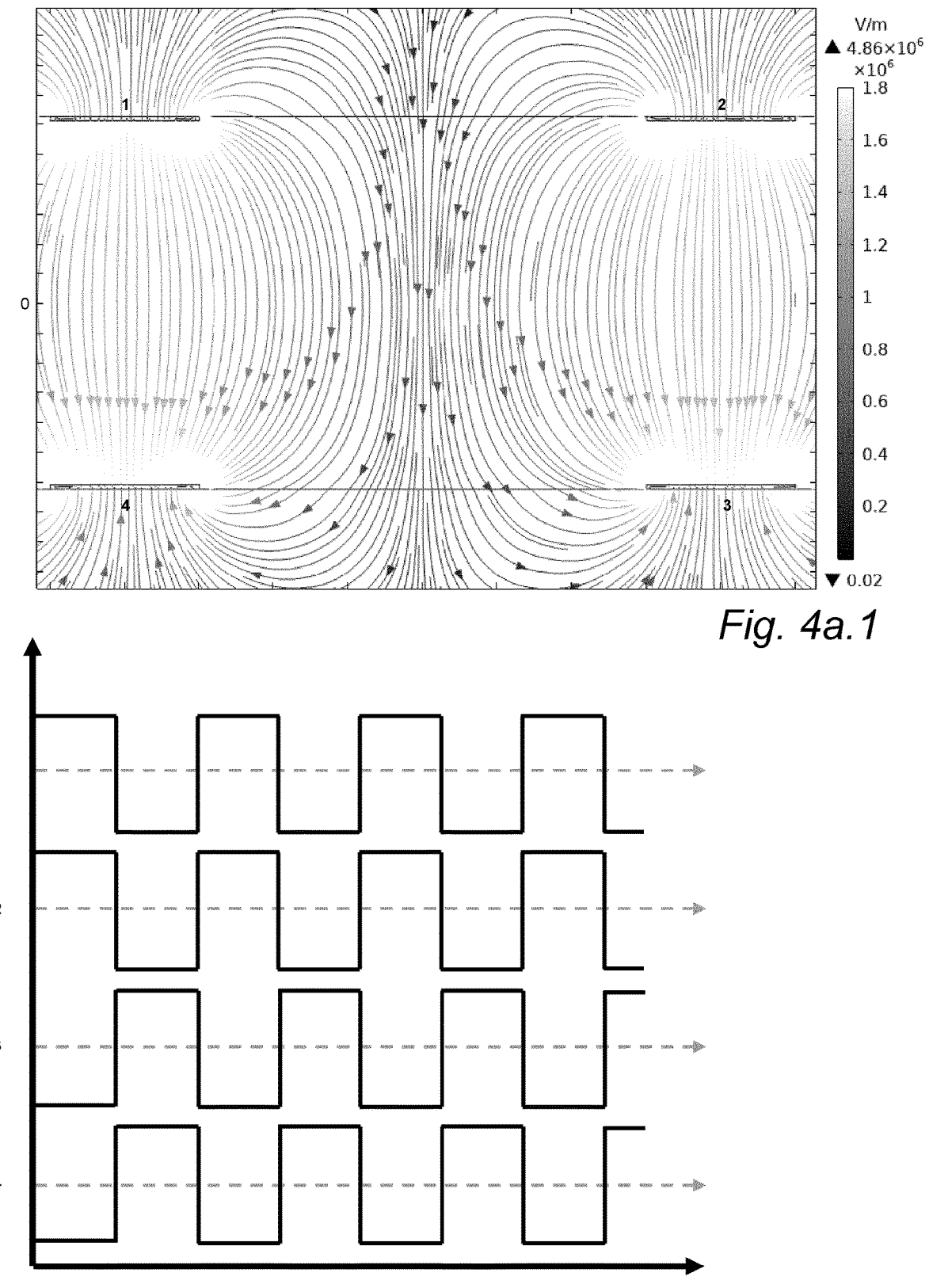
*Fig. 4a.1*
*Fig. 4a.2*

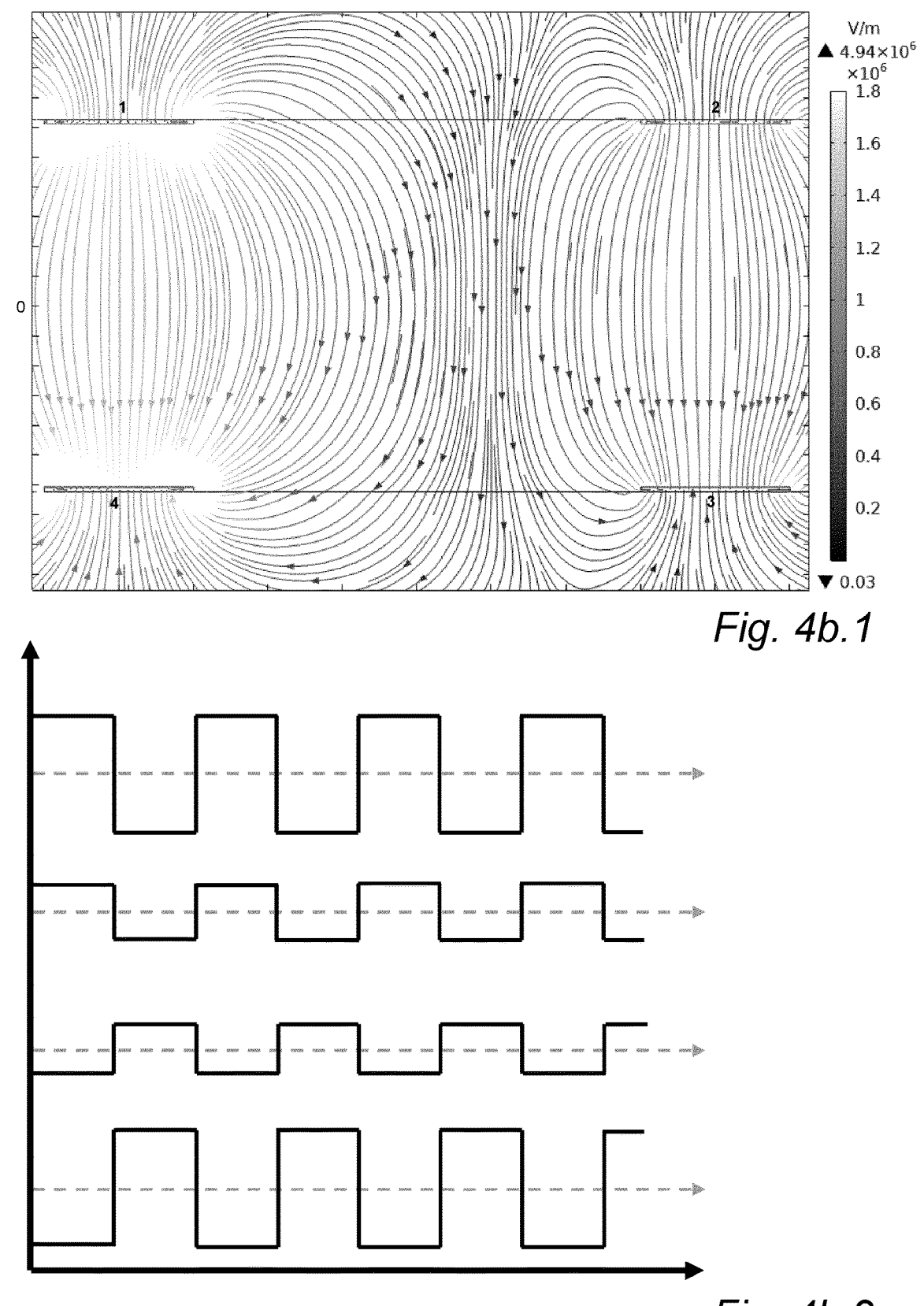
Fig. 4b.1
Fig. 4b.2

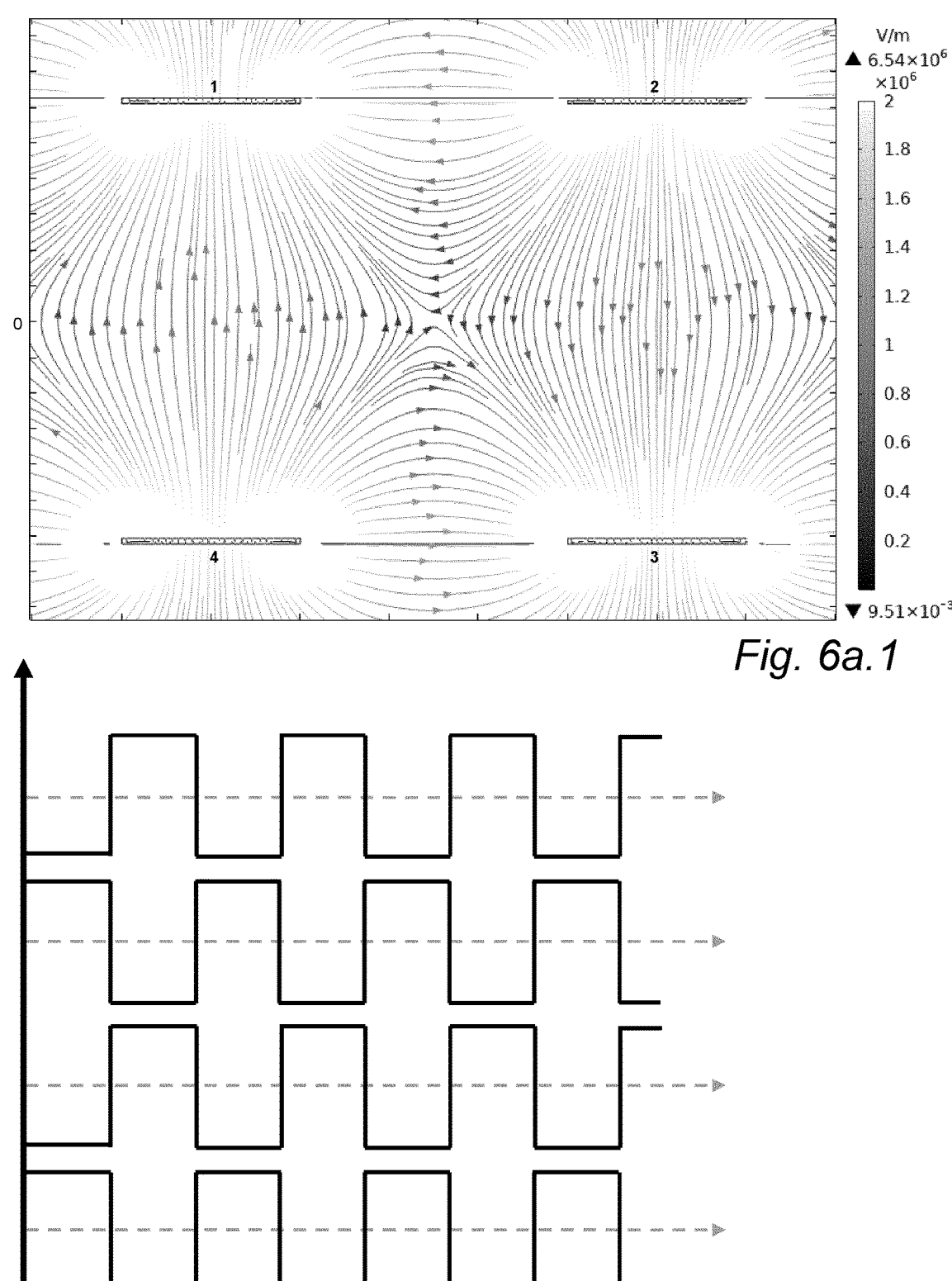
*Fig. 6a.1*
*Fig. 6a.2*

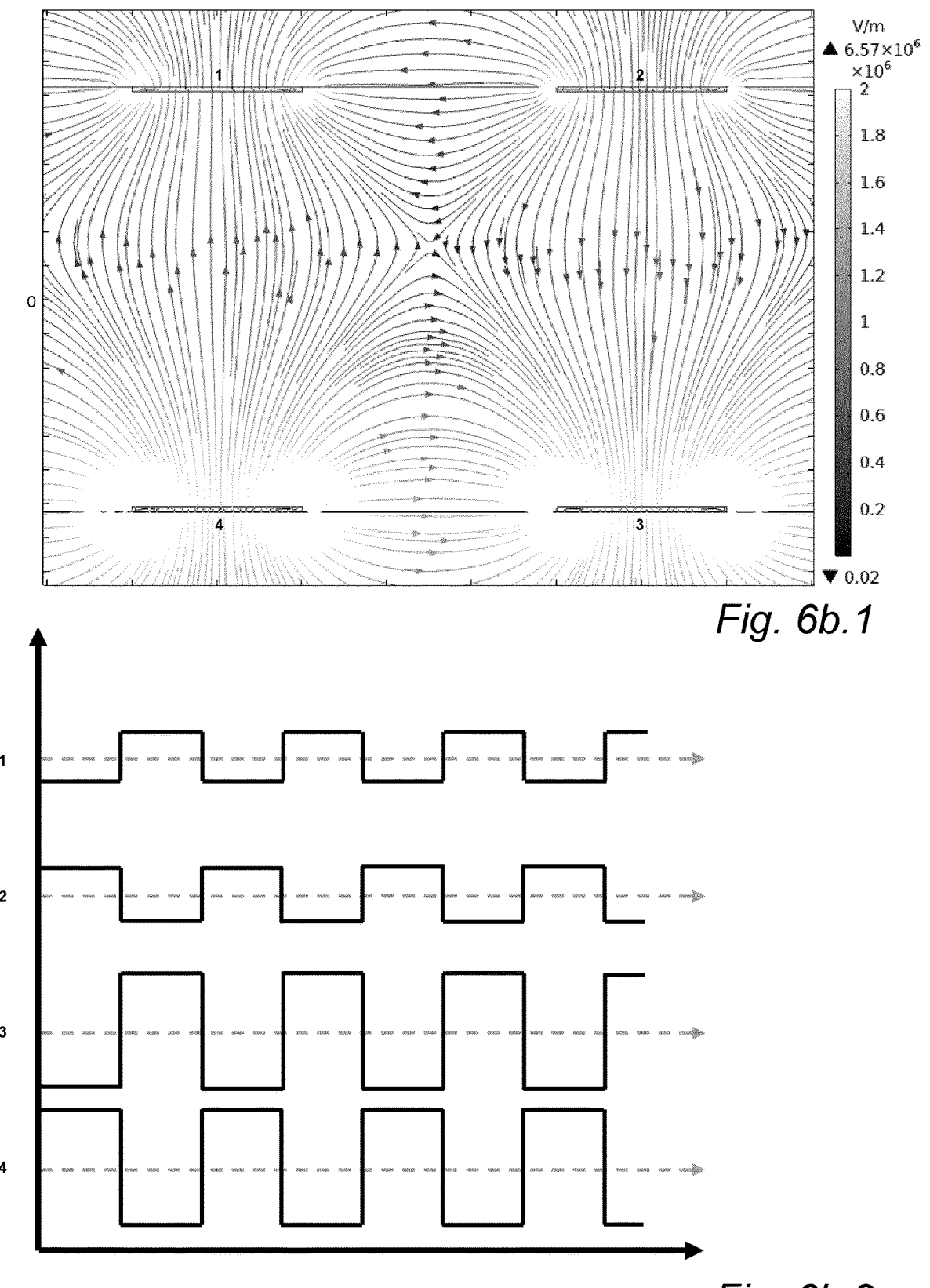
Fig. 6b.1
Fig. 6b.2

1000    1001

1010

1020

1110

1130    1120

1122

1124

1126

1140

ASYMMETRIC DRIVING FOR OPTICAL MODULATOR

RELATED APPLICATIONS

The present patent document is the national stage of International Application No. PCT/EP2023/065535, which was filed on Jun. 9, 2023, and which claims the benefit of priority to EP patent application Ser. No. 22/181,537.6, which was filed Jun. 28, 2022. The aforementioned applications are hereby incorporated by reference in their entirety.

FIELD OF THE INVENTION

The invention relates to an electrophoretic optical modulator, a controller, a method of controlling an electrophoretic optical modulator, and a computer readable medium.

BACKGROUND

Optical modulators, such as optically active glazing is known in the art. Typically, an optically active glazing system comprises two parallel plates, made from a transparent dielectric material such as glass or a plastic material. The internal volume defined between the plates may be subdivided into a plurality of small independent volumes or individual cells that are filled with a dielectric fluid. The fluid contains a suspension of particles of a dielectric, charged or chargeable material. The facing faces of the two plates carry electrodes facing each other. The electrodes are connected to an electrical power supply associated with a control means.

The electrodes of each plate may be formed by combs that are interleaved into one another in pairs. The electrodes of two interleaved combs are capable of taking up electrical voltages of polarities that are identical or opposite. With a suitable voltage on the electrodes the particles can be concentrated at different locations between the electrodes to give the system either a transparent or an opaque appearance.

There are various drawbacks associated with the known system. Although the optically active glazing can transition from one state to another, e.g., from a transparent state to an opaque state, such a transition takes a long time and is often not fully uniform. Furthermore, the lifespan of existing devices is limited.

SUMMARY OF THE INVENTION

Embodiments herein address these and other issues. For example, in an embodiment, an electrophoretic optical modulator comprises at least a first substrate and a second substrate arranged opposite thereto. An optical layer is arranged between the first and second substrates that comprises a fluid comprising particles, the particles being electrically charged or chargeable. Multiple interdigitated electrodes being arranged across each of the first and second substrate. A controller is configured to apply an electric AC signal to the multiple electrodes to obtain an electric field between the multiple electrodes providing electrophoretic movement of the particles towards or from one of the multiple electrodes causing modulation of the optical properties of the light modulator. The controller is configured to modulate the amplitudes of the electric AC signals applied to the multiple electrodes on the substrates causing a low-electric field region to move with respect to the electrodes.

By modulating the amplitudes of the signal, the region where the electric field is low, and in particular lowest, moves in the optical layer. For example, if signals on one substrate are scaled down, while signals on the other substrate are not, or even scaled up, the low-electric field region moves toward the former substrate. Likewise, by manipulating signals on neighboring electrodes the low-electric field regions can be made to move in parallel with a substrate. In fact particle movement in a low-electric field region can be absent, the particles being static with respect to the electrodes. Moving such a region allows the static particles to escape from so that they do not slow the transitioning of the panel. In particular, a so-called dead region where the electric field is absent can be moved in the optical layer.

Moving a low-electric field region, and in particular a dead region has several advantages. The particles that are in a low-electric field region do not respond to the electric field as quickly as particles in high-electric field regions. As a result those regions transition slowly, and transition is not uniform. Furthermore, by moving the low-electric field region around, mixing of the particles is increased generally.

An optical modulator as described herein may be applied in a wide range of practical applications. For example, an optical modulator having at most one non-transparent substrate may be used as a surface that can change its optical appearance, such as its reflective or transmissive status. In particular, a light modulator having all substrates transparent may be used an optically active glazing, e.g., for offices, cars, casings and the like.

An embodiment of the control method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1*a* schematically shows an example of an embodiment of a substrate, FIG. 1*b* schematically shows an example of an embodiment of an optical modulator, FIG. 1*c*.1-1*c*.5 schematically show an example of an embodiment of scaling factors, FIG. 2*a*.1 shows an example of an electric field in an embodiment of an optical modulator, FIG. 2*a*.2 schematically shows an example of AC signals in an embodiment of an optical modulator, FIG. 2*b*.1 shows an example of an electric field in an embodiment of an optical modulator, FIG. 2*b*.2 schematically shows an example of AC signals in an embodiment of an optical modulator, FIG. 2*c*.1 shows an example of an electric field in an embodiment of an optical modulator, FIG. 2*c*.2 schematically shows an example of AC signals in an embodiment of an optical modulator.

Figure 1A:
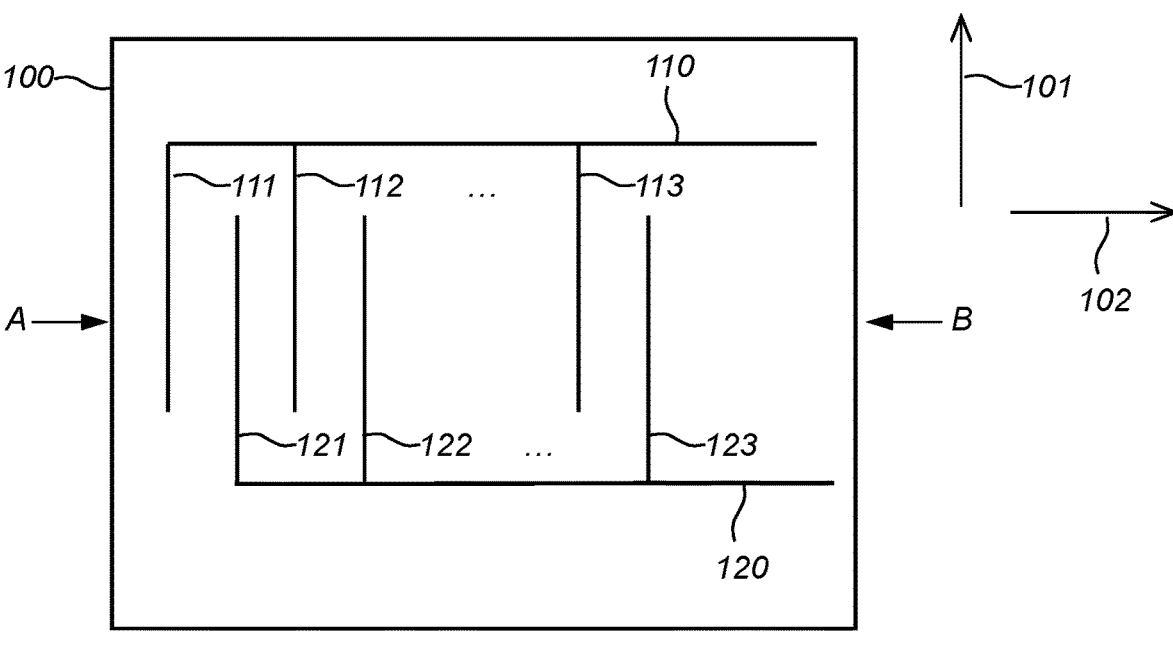

LIST OF REFERENCE NUMERALS 1,2,3,4 an electrode
10 a light modulator
11 a first substrate
12 a second substrate
13, 13*a*, 13*b* electrodes
14, 14*a*, 14*b* electrodes
15 a fluid
16 a controller
30 particles
20 a car
21 a light modulator
40 a light modulator
41 a first substrate
42 a second substrate
43 a third substrate
46 a controller 100 a substrate
101 a first direction
102 a second direction
110 a first electrode
120 a second electrode
111-113 a main-line
121-123 a main-line
151 a first substrate
152 an optical layer
153 a second substrate
160 a controller
1000, 1001 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1*a* schematically shows an example of an embodiment of a substrate 100 for use in an optical modulator according to an embodiment. There are at least two electrodes arranged in a pattern across a surface of substrate 100. Shown in FIG. 1*a* are two electrodes on the same surface: a first electrode 110 and a second electrode 120. There could be more than two electrodes on the same side of the substrate, e.g., to facilitate more fine-grained control. For example, multiple electrodes may be used to facilitate a segmented substrate, e.g., for a segmented optical modulator. For example, in a segmented optical modulator some zones may have different optical properties, e.g., a different transparency or reflectivity. Below an embodiment with two electrodes is shown, but additional electrodes could be added to them, e.g., by replicating similar structures next to each other.

First electrode 110 and second electrode 120 are applied to a same side of the substrate. The two electrodes are arranged in a pattern across the substrate. There could also be one, two or more electrodes on the other surface of substrate 100, e.g., to facilitate stacking of three or more substrates. Applying electrodes to a substrate may be done lithographically, e.g., using a mask representing the electrodes pattern. Electrodes may also be applied by embedding them in the substrate.

First electrode 110 and second electrode 120 each comprise a multiple of main-lines. As shown in FIG. 1*a*, first electrode 110 comprises main-lines 111, 112, and 113, and second electrode 120 comprises main-lines 121, 122 and 123. Typically, each electrode will comprise more lines than three. The main-lines extend across the substrate. The multiple of main-lines of the first and second electrode are arranged alternatingly with respect to each other on the substrate. The main-lines extend across the substrate in a first direction 101. When viewed in a second direction 102, the main-lines are encountered alternately from different multiples, e.g., from the first and second multiple in the first and second electrode respectively. The first and second direction make an angle with each other, typically the angle is substantially perpendicular. The first and second direction may each be parallel to a side of the substrate, but this is not necessary.

For example, substrate 100 may be combined with another substrate to form a transparent optical modulator, at least one of which is transparent. Light incident with the optical modulator being modulated in a manner dependent upon particles in an optical layer between the two substrates. In an embodiment, both substrates are transparent, forming a light modulator. A motivating application for a substrate such as substrate 100 is in smart glazing, e.g., a light modulator, which may be applied in domestic housing, offices, green houses, cars, and the like.

The level of transparency or reflectivity of the light modulator can be adapted electrically. For example, in a light modulator, e.g., in smart glazing two substrates such as substrate 100 would be stacked so that the sides on which the two electrodes are applied face each other. A fluid with particles is enclosed between the two substrates. Smart-glazing embodiments are further discussed below. In an embodiment, electrodes, e.g., two or more electrodes are applied to one surface of each substrate. There could also be one, two or more electrodes on the other surface of substrate 100, e.g., to facilitate stacking of three or more substrates.

Some embodiments below show examples of modulating a transparency or reflectivity level. Light modulators may be adapted for other optical effects. For example, if desired, embodiments could be modified to different levels of translucency instead of different levels of transparency. If desired, the type of particle that is used in an embodiment can be varied, e.g., to particles that differ in which wavelengths they absorb or reflect, and how specular or diffuse the reflection is. For example, in an embodiment, a light modulator can modulate different levels of reflection. Particles can also emit light. Stacking multiple optical layers further increases the possibilities.

Having two sets of alternating main-lines is sufficient to provide electrically adaptable glazing; due to the alternating two sets the electric field at any part of the substrate can be controlled as two opposite electrodes border the part from two opposing sides.

The multiple electrodes applied on the substrate are interdigitated to manipulate the electric field between two substrates. In FIG. 1*a* the main electrodes are shown as having multiple interdigitated parallel main lines. This is a possible configuration, but in an embodiment the shape of the electrodes can vary greatly. For example, by adapting the shape of the electrodes the diffraction effect can be altered.

Figure 1B:
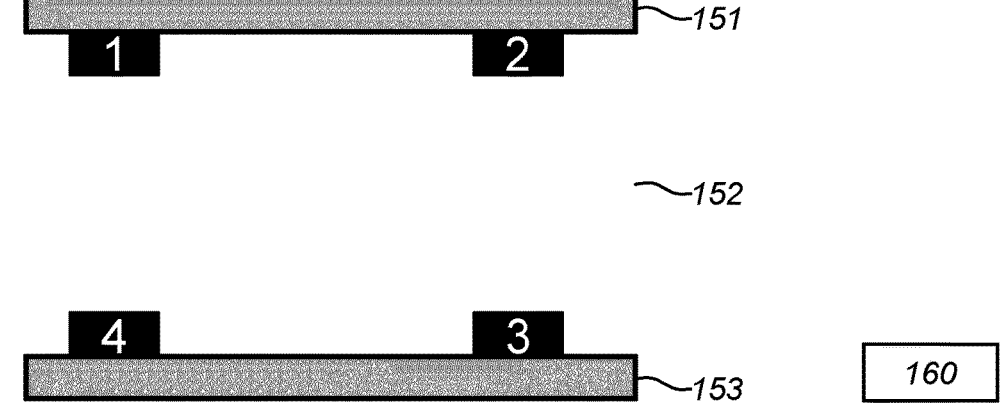

FIG. 1*b* schematically shows an example of an embodiment of an electrophoretic optical modulator. A substrate such as the one schematically shown in FIG. 1*a*, may be combined with a similar substrate opposite it, e.g., with its mirror image. Four electrodes of a schematic intersection of such an optical modulator, at line AB of FIG. 1*a* is shown in FIG. 1*b*. Shown in FIG. 1*b* is a first substrate 151, and a second substrate 153 that are arranged opposite each other. Between first substrate 151 and second substrate 153 an optical layer 152 is arranged. Optical layer 152 between first substrate 152 and second substrate 153 comprises a fluid comprising particles (not shown). The particles are electrically charged or chargeable.

At least two interdigitated electrodes are arranged on first substrate 151 and on substrate 153, At least two interdigitated electrodes are arranged opposite thereto. Shown on first substrate 151 are two electrode 1 and electrode 2. For example, electrode 1 may be electrode 111, and electrode 2 may be electrode 121. Shown on second substrate 153 are two electrodes 4 (opposite electrode 1) and electrode 3 (opposite electrode 2). Although not shown, substrate 151 might continue with electrodes 1, 2, 1, 2, . . . , and substrate 153 with electrodes 4, 3, 4, 3, . . . and so on.

A controller 160 is configured to apply an electric AC signal to each of the multiple electrodes, e.g., to electrodes 1,2,3, and 4, on the two substrates to obtain an electric field between the multiple electrodes. The electric field provides electrophoretic movement of the particles towards or from one of the multiple electrodes causing modulation of the optical properties of the light modulator. The same numbering of electrodes in cross-section is used in FIGS. 2*a*.1-6*b*.2.

Controller 160 is configured for controlling and/or generating asymmetric AC signals for an electrophoretic optical modulator.

Controller 160 is configured to apply electric AC signals for applying to the multiple electrodes to obtain an electric field between the multiple electrodes providing electrophoretic movement of the particles towards or from one of the multiple electrodes causing modulation of the optical properties of the light modulator. For example, controller 160 may generate the electric AC signals. For example, in case of two electrodes per substrate, controller 160 may be configured to generate a set of four AC signals for application to the electrodes. Application may be direct from controller 160 to the electrodes. Application may be indirect from controller 160 to the electrodes, e.g., through an intermediate processing device, e.g., an amplifier, and/or a filter, etc.

There are a number of optical properties that may be modulated in the optical modulator; for example, transparency, reflectivity, color, and so on. For the sake of simplicity the embodiments are described in terms of control of gray scale between fully transparent and fully opaque. The skilled person will understand however, that different optical properties can be manipulated by using different particles and/or different substrates. Particles are sometimes referred to as pigments.

Controller 160 is configured to modulate the amplitudes of the electric AC signals applied to the multiple electrodes on the substrates causing a low-electric field region to move with respect to the electrodes.

In conventional driving of the electrodes of an optical modulator, including during AC driving, the electric field potential shows regions in the optical layer where the electric field is much lower than at other regions in the optical layer. Such low-electric field region are disadvantageous as particles are hard to control in such a region. In particular, due to the low electric field in the low-electric field region, particles move slower there. Most of the time needed to transition from one optical state to another optical state is caused by the slow movement of particles in low-electric field regions.

For example, in a low-electric field region of the optical layer the electric field strength may be only 25% or less than elsewhere in the optical layer. For example, in some regions of the optical layer the electric field strength may be only 15% or less, 10% or less, 1% or less, compared to the maximal electric field in the optical layer, etc. For example, in a low-electric field regions of the optical layer the electric field strength may be less than $2*10^6$ V/m, less than $1*10^6$ V/m, less than $1*10^5$ V/m, etc. For example, the low-electric field region may be taken to be the region in the optical layer where electric field is minimal. For example, the low-electric field region may be taken to be the region in the optical layer where electric field is minimal, or a predetermined percentage larger than minimal, e.g., at most 10%, at most 15%, etc.

Electric field may be measured directly, however computer simulation of the electric field turns out to be sufficiently accurate for practical applications. For example, one may use the well-known COMSOL software for simulation electric field diagrams. Herein, the strength of electric field may be generated using Electrostatic study under the AC/DC module of COMSOL Multiphysics. Electric field diagrams shown herein were created with the above-mentioned software.

In particular, in the optical layer there may be regions where the electric field is absent, e.g., is null, or substantially null. Such a region is called a dead region. Particles in a dead region, essentially do not respond to electrophoretic control. Through other means, e.g., slow entropic movement, a particle can drift out of a dead region, and become susceptible to controlled movement again. Dead regions are particularly problematic for quick transitions between optical modes of the optical modulator. The dead region is sometimes referred to as an electric field neutral region, or neutral point. The neutral point may be a point in the 2D intersection as shown in the figures; however in a physical 3D embodiment, the neutral point may be a neutral curve or a neutral volume.

In embodiments problems caused by low electric field regions, and in particular dead regions, are addressed by variations of the potential differences between electrodes. By modulating the relative magnitude of signals applied to electrodes this electric field neutral point or volume is moved in the optical layer between the substrates.

In an embodiment, the overall drive may use AC signals and maintain current neutrality and a balance in the various electric fields in time. This is advantageous as it reduces erosion of the electrodes.

In an embodiment, electric field lines are modulated such that neutral points shift in position in the optical layer so that the total volume under electric field influence, e.g., electrophoretic control, increases.

In an embodiment, the main parameter varied in the signals is the amplitude, e.g., the amplification level of the signal. Other parameters to vary in an asymmetric way between electrodes include frequencies, signal shape (square, sinusoidal, etc.), durations, phase.

Asymmetric driving of the electrodes, as further explained herein has the advantage of faster transition between optical states. Asymmetric driving of the electrodes further gives the advantage of more uniform transition, as the differences between slow and fast transitioning location on the panel is reduced. An additional advantage of asymmetric driving is the reduced cumulation of particles on electrodes. In a conventional optical modulator, especially in a DC driving modulator, particles may accumulate on electrodes and may be compacted there locally. This may lead to particle interaction there and the particles forming non-reversible aggregations. Such aggregations of particles are undesirable. The aggregation effect causes issues such as of non-homogeneity and gravity effects. However, with asymmetric drive as in an embodiment, particles are increasingly in motion and therefore annealing into aggregations is limited. Moreover, particle movement is more uniform.

A dead region, e.g., a neutrality point or volume, also leads to optical aberrations due to particle accumulation during operations. By increasing particle mobility, aggregation is less, and the particles are less likely to fall due to gravity. Improved particle mobility allows better closing and dispersion of particles to reach a non-transparent state, while maintaining a particle distribution that is closer to the initial state of dispersion at manufacture.

Interestingly, asymmetric drive can be added to an existing algorithm used to drive a panel to a target gray scale. Moreover, introducing asymmetric drive can still maintain current neutrality. For example, one could use the algorithms described in say, PCT/EP2021/071346 with title "Light Modulator, Light Modulator Method And Smart Glazing" and introduce scaling of signals to move low-electric field regions, and in particular dead regions.

For example, a controller may be configured with a set of algorithms, e.g., for one or more of the functions: going up in transparency, going down in transparency, maintaining a present transparency, etc. There may be more or fewer algorithms. For example, algorithms may differ depending on the size of the jump in transparency that is desired. For example, a maintaining algorithm may be omitted. For example, in a simplified embodiment, the controller may have an algorithm for driving towards full transparency, and algorithm for driving to full opacity. For example, computer program code may be stored in a memory of the controller to implement said algorithms. In an embodiment, the controller is configured to apply a programmed driving algorithm for a certain duration, which may depend on, e.g., present transparency, target transparency, and measured sensor values, e.g., as explained in the cited PCT application.

An existing algorithm can be modified by periodically scaling one or more of signals down or up, so that the low-electric field region moves, and in particular, the dead region. For example, an existing driving algorithm may be modified to be asymmetric by introducing asymmetric scaling, and after a predetermined period changing the direction of asymmetric scaling. As the asymmetry of the drive changes, the low-electric field region moves. In an embodiment, the volume in the optical layer is scanned by a higher strength electric field line, causing all particles in the volume to be susceptible to electric control at some point during the scan. Asymmetric drive can be used advantageously both for driving towards a target transparency and for maintaining a gray scale. An open drive can also vary in asymmetry while maintaining gray scale.

Asymmetric drive allows faster transition, in particular a much faster closing of the device (that is, driving toward opacity) since a larger part of the particle population is moved irrespective of a particle's initial location, including middle position between electrodes and electrodes surfaces.

Typically, scaling of signals is applied to pairs of electrode signals. For example, a pair of signals X and Y may be applied to a pair of electrodes. The electrodes may be, e.g., a pair of opposite electrodes, a pair of neighboring electrodes, a pair of diagonally opposed electrodes. The electrode signals before scaling typically have the same phase, and have the same amplitude; in fact the pair of signal may be the same signal. However, there may be a difference in phase or amplitude even before scaling. For example, phase differences may be used to trap particle. For example, scaling differences may be used to compensate for hardware differences, e.g., between substrates amplification and the like. In particular the signals X and Y may be conventional AC driving signals for an electrophoretic optical modulator. The signals X and Y may be scaled to move low-electric field regions in the optical layer. For example, a time varying scaling factor may be applied to a signal. FIGS. 1c.1-1c.4 schematically shows example of an embodiment of scaling factors.

In FIG. 1c.1, the scaling factors are chosen such that one signal is scaled up (amplified) when the other is scaled down (de-amplified). In an embodiment, the product of the scaling factors may be 1. In an embodiment the sum of the logarithms of the scaling factors may be 0.

In FIG. 1c.2, the scaling factors are chosen such that only one of the two signals is amplified while the other is kept constant. In the figure, the scaling alternates. Note, that in these examples, instead of scaling-up, scaling down may be used. In fact, using scaling-down is easier, as the signals stay within predetermined bounds.

FIG. 1c.3, is the same as FIG. 1c.2, except that scaling is alternated with a period in which no scaling is used.

In FIG. 1c.4, only one of the signals is scaled, while the other is kept constant. In FIG. 1c.5, only one of the signals is scaled, while the other is kept constant. In FIG. 1c.5 a signal is scaled up and down alternatingly. In this example, scaling is combined with periods of no scaling.

Many other variations are possible. For example, a slight noisy scaling may be added to randomize slightly the location of low-electric field regions. These examples, use triangular changing scaling factors, but other shapes are possible, e.g., square wave, sinus, etc.

FIGS. 2a-2c schematically shows an example of AC signals in an embodiment of an optical modulator arranged for closing the panel, that is for reducing transparency of the panel. FIGS. 2a.1, 2b.1 and 2c.1 show an example of an electric field in an embodiment of an optical modulator. The electric field is shown in the same plane as shown in FIG. 1b. FIGS. 2a.2, 2b.2 and 2c.2 schematically show an example of AC signals corresponding to the electric field diagram. Note that FIGS. 2a.2, 2b.2 and 2c.2 schematically show the signals after scaling, whereas FIGS. 1c.1-1c.4 schematically show scaling factors.

The movement of particles is to a large extend dictated by the electric field, and its shape, as indicated by the electric field diagrams, although some other factors may also have some influence on the motion of the particles, e.g., Brownian motion, temperature, and so on.

The y-axis in FIG. 2a.2, and in similar diagrams, indicate schematically the voltage of a signal applied to an electrode. The dashed horizontal line in the four signals indicate the neutral voltage, e.g., zero voltage line for each signal. The x-axis schematically indicates time. Note that the four signals are AC signals. The FIG. 2 show square signals but other AC type signals, such as triangle, sinusoidal and combination thereof, can be used. The driving shown in FIG. 2a.2 is configured for closing the optical modulator, e.g., decreasing transparency, increasing the gray level. If the driving shown in FIG. 2a.2 were continued for a long time, the substrate would eventually approach maximum opacity. Driving does not need to continue, until full opacity though; driving can be terminated at some desired gray level before that time.

Note that signals 1 and 4 are equal, so that halfway between substrates 1 and 4, there is a dead region. The same holds for signals 2 and 3. Particles in the dead region do not respond to the electric field, as the electric field is absent there. Near the zero electric field points, electric field is low, e.g., there is a low electric field region. Particles in the low electric field region respond to electric field, but do so slowly.

In closing operations, as shown in FIGS. 2a-2c, the low-electric field region comprises a dead region between the substrates, e.g., within the optical layer. The dead region is moved by introducing asymmetry in the driving.

In FIG. 2a.2, the AC signals applied to opposite electrode pair 1 and 4 and to opposite electrode pair 2 and 3 is equal. In FIG. 2a.2, the AC signals applied to neighboring electrode pair 1 and 2 and to neighboring electrode pair 4 and 3 are equal except for a phase shift, in this case a phase shift over 180 degrees. An opposite electrode pair are two different electrodes opposite each other on opposite substrates. A neighboring electrode pair are two different electrodes next to each other on the same substrate. There is a dead region halfway between electrodes 1 and 4, and halfway between electrodes 2 and 3.

FIG. 2b.2 show an asymmetry introduced in the driving of the panel. In FIG. 2b.2, the AC signals applied to opposite electrode pair 1 and 4 and to opposite electrode pair 2 and 3 are equal except for scaling. For example, the driving in FIG. 2b.2 can be obtained from the driving in FIG. 2a.2 by scaling down the driving on electrodes 1 and 2, e.g., by scaling down the driving of one of the electrodes in a pair of opposite electrodes. In this case, the signal to electrodes 1 and 2 has been scaled down. Scaling up or down can be done using an amplifier, by a variable resistor, or by changing parameters in a signal generator, etc. In FIG. 2b.2, the AC signals applied to neighboring electrode pair 1 and 2 and to neighboring electrode pair 4 and 3 are equal except for a phase shift, in this case a phase shift over 180 degrees.

The effect of the driving shown in FIG. 2b.2 is still to close the panel. Note that the low-electric field region in FIG. 2a.1 has moved up in FIG. 2b.1; in particular a dead region has moved up.

In FIG. 2c.2 the direction of scaling is reversed. The asymmetry introduced in a pair of opposite electrodes during a closing operation, is now in the opposite direction. This means that the dead region is now moved down, e.g., toward the bottom substrate. Note that the directions up and down are relative. These terms relate here to the panel as shown in the figure and are short for towards the first substrate or towards the second substrate; in an embodiment a panel could be vertical so that directions like up and down might be front and back, or the like.

To decrease transparency, e.g., to close the panel, the panel may be driven by alternating between the three types of signals. For example, a driving may have a middle dead region as in FIG. 2a, a top dead region as in FIG. 2b, or a bottom dead region as in FIG. 2c. For example, in an embodiment driving may repeat a cycle like: middle dead region driving, top dead region driving, middle dead region driving, and bottom dead region driving.

Closing a panel using this type of two-direction asymmetric driving makes reaching dark grays significantly faster. With conventional symmetric drive, transitioning from 10% gray to 1% gray, that is from light gray to full dark, may take about ten times as long as in an embodiment.

Using a two-directional asymmetric drive is preferable as a larger part of the volume is scanned, and mixing of particles is thereby improved. It is not necessary though; improved driving may be achieved by repeating a cycle such as: middle dead region driving, top dead region driving.

Figure 3A:
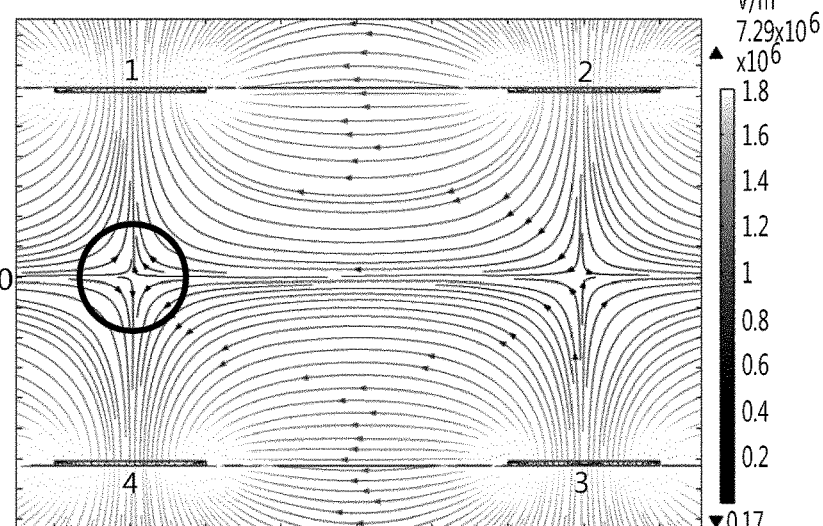
FIGS. 3*a*-3*c* show an example of an electric field in an embodiment of an optical modulator, FIG. 4*a*.1 shows an example of an electric field in an embodiment of an optical modulator, FIG. 4*a*.2 schematically shows an example of AC signals in an embodiment of an optical modulator, FIG. 4*b*.1 shows an example of an electric field in an embodiment of an optical modulator, FIG. 4*b*.2 schematically shows an example of AC signals in an embodiment of an optical modulator.
Figure 3B:
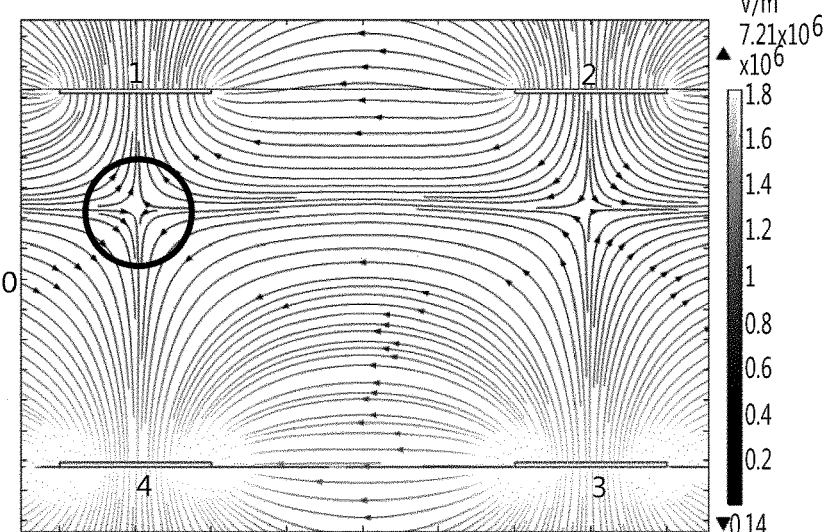
Figure 3C:
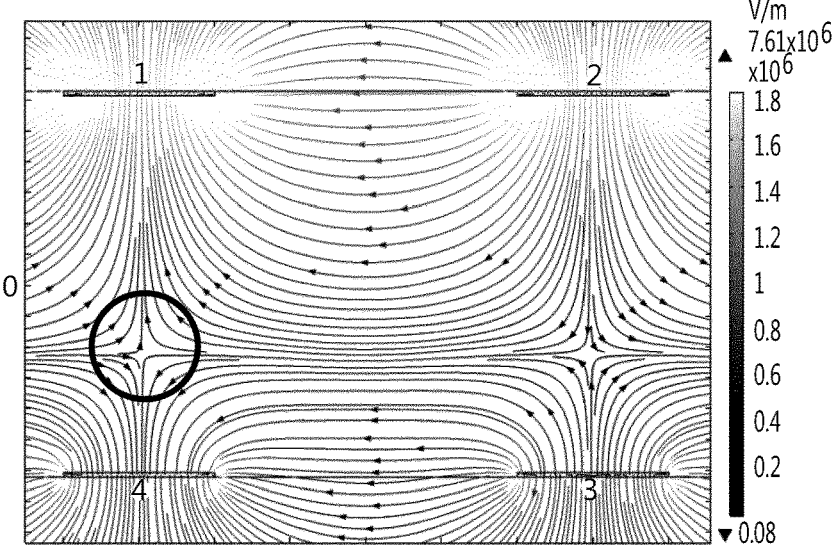

FIGS. 3a-3c show an example of an electric field in an embodiment of an optical modulator. The electric field diagrams in FIGS. 3a-3c are the same as in FIGS. 2a.1-2c.1. Shown in the FIGS. 3a-3c is a low-electric field region schematically indicated by a circle. The center of the circle correspond with a portion of the field where electric field is absent, e.g., a dead region. Note that the position of the dead region moves with respect to the electrodes. In this case, the dead region moves substantially orthogonal to the substrates. Orthogonal movement is convenient, though not necessary, by introducing asymmetry in a neighboring pair of electrodes as well as in opposite pairs of electrodes the dead region can be moved parallel to a substrate as well. For improved mixing orthogonal movement is sufficient though.

FIGS. 3a-3c show different stages in a closing operation using asymmetric driving. The dead region moves within the optical layer between two opposite substrates, e.g., towards and away from any of the two substrates. For example, the controller may be configured to apply a scaling operation to the signals applied to the electrodes. For example, the signals applied to opposite electrodes may be the same except for a scaling applied to one or both of them. The amount of scaling depends on the application, e.g., on the size of the panel and the thickness of the optical layer. As an example, a first AC signal applied to a first electrode may be scaled with respect to a second AC signal applied to a second electrode, e.g., opposite the first electrode, wherein the lower amplitude of the first and second AC signal is at most 70%, 50%, 45%, 40%, 30% of the higher amplitude.

The signals schematically shown in the figures are square waves, though in practice this is not at all necessary. The signals may be sine waves instead. For example, a low-pass filter may be applied to the signals as shown in the figures. The low-pass threshold may be chosen in dependence on the size of the panel, e.g., 1 kHz for a larger panel.

For example, in an embodiment, a controller may have a signal generator that is configured for a dead region in the middle of the optical layer. An asymmetry modulator may modulate the signals to move the dead region towards or away from one of the substrate. The asymmetry modulator may cycle through different scaling. For example, a scaling between two AC signals applied to an opposite pair of electrodes may cycle between a lower scaling factor and an upper scaling factor. The controller may also directly generate scaled signals.

Scaling may keep one signal constant while decreasing and/or increasing the other signal. For example, the first AC signal may have a constant amplitude, and the second AC signal may be scaled with respect to the first AC signal. The signal to keep constant and the signal to scale may switch in time. Scaling may be done on low voltage signals, but may also be introduced during amplification of the signals. In an embodiment, scaling of the signals is randomized to randomize the position of dead region. In an embodiment, scaling of the signals is controlled to move the position of the low-electric field region in a controlled way, e.g., along a predetermined path through the optical layer.

Once a target gray level is reached, e.g., as indicated by sensors associated with the panel, e.g., optical and/or electric sensors. The driving signals may be aborted. The panel will keep its gray level for some time, though the appearance of the panel may decay with time, so that a conventional maintenance driving may be used. Maintenance driving may comprise a slow, and low power driving of the panel to grayness level near the target gray level. Maintenance driving may be alternated with no driving at all. During maintenance, asymmetric signals may also be used, as this will improve mixing and increase the durability of the panel.

FIGS. 4a-4b schematically shows an example of AC signals in an embodiment of an optical modulator arranged for opening the panel, that is for increasing transparency of the panel. FIGS. 4a.1, and 4b.1 show an example of an electric field in an embodiment of an optical modulator. The electric field is shown in the same plane as shown in FIG. 1b. FIGS. 4a.2, and 4b.2 schematically show an example of AC signals corresponding to the electric field diagram.

In FIG. 4a.2, the AC signals applied to neighboring electrode pair 1 and 2 and to neighboring electrode pair 3 and 4 is equal. In FIG. 4a.2, the AC signals applied to opposite electrode pair 1 and 4 and to opposite electrode pair 2 and 3 are equal except for a phase shift, in this case a phase shift over 180 degrees. There is a low-electric field region halfway between electrodes 1 and 2, and between electrodes 3 and 4, stretching from substrate to substrate. FIG. 4a.1 also shows two dead regions: a dead region between electrodes 1 and 2, and a dead region between electrodes 3 and 4. These two dead regions are located outside of the optical layers. As there are no particles relevant for the shown electrodes 1-4, these dead regions are not a problem on their own. However, stretching between these two dead regions, there is a low-electric field region. Particles in the low-electric field region respond to the electric field quicker than particles in a dead region, but the particles in the low-electric field region still move slower than those elsewhere in the optical layer. For example, the electric field in the low-electric field region between the two dead regions, maybe 25% lower than the field midway and directly between the electrodes.

FIG. 4b.2 shows an asymmetry introduced in the driving of the panel. In FIG. 4b.2, the AC signals applied to neighboring electrode pair 1 and 2 and to neighboring electrode pair 3 and 4 are equal except for scaling. For example, the driving in FIG. 4b.2 can be obtained from the driving in FIG. 4a.2 by scaling down the driving on electrodes 2 and 3, e.g., by scaling down the driving of one of electrodes in a pair of neighboring electrodes. In this case, the signal to electrodes 2 and 3 has been scaled down. In FIG. 4b.2, the AC signals applied to opposite electrode pair 1 and 4 and to neighboring electrode pair 2 and 3 are equal except for a phase shift, in this case a phase shift over 180 degrees.

The effect of the driving shown in FIG. 4b.2 is still to open the panel. Note that the low-electric field region in FIG. 4a.1 has moved to the right in FIG. 4b.1. The size of the low-electric field has also somewhat increased. If only driving of the type shown in FIG. 4b.2 were used this could make moving particles near electrodes 2 and 3 harder, but as the driving is combined with asymmetric driving in the other direction this is not a problem.

In FIG. 4b.2 the direction of scaling could also be reversed, e.g., by scaling down signals 1 and 4 instead of signals 2 and 3. The asymmetry introduced in a pair of neighboring electrodes during an opening operation, will then be in the opposite direction, e.g., the low-electric field region will move to the left.

To increase transparency, e.g., to open the panel, the panel may be driven by alternating between the three types of signals. For example, a driving may have a center low-electric field region as in FIG. 4a, a right low-electric field region as in FIG. 4b, or a left low-electric field region (not shown in a separate figure). For example, in an embodiment driving may repeat a cycle between a low-electric field: center, left, center right; or just center, left. The time spent in different phases need not be equal. For opening, the time in spent in center may be higher than the time spent in driving with a left or right low-electric field.

In an embodiment, during an opening operation the low-electric field region may move parallel to the substrates. As discussed for closing operations, similar options for generating the signals are possible for opening operations. For example, a signal may be scaled, and a scaling factor may repeatedly run through a range of scaling factors.

Figure 5A:
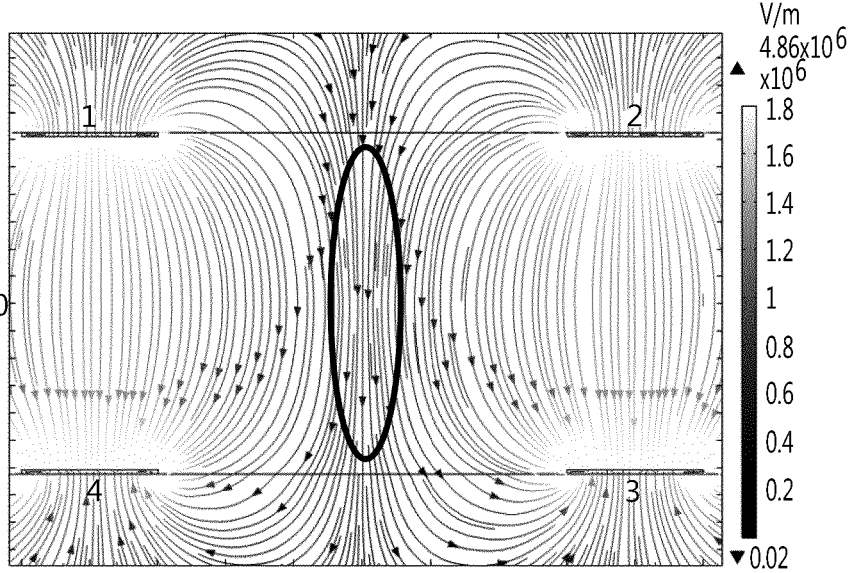
FIGS. 5*a* and 5*b* show an example of an electric field in an embodiment of an optical modulator, FIG. 6*a*.1 shows an example of an electric field in an embodiment of an optical modulator, FIG. 6*a*.2 schematically shows an example of AC signals in an embodiment of an optical modulator, FIG. 6*b*.1 shows an example of an electric field in an embodiment of an optical modulator, FIG. 6*b*.2 schematically shows an example of AC signals in an embodiment of an optical modulator, FIGS. 7*a*-7*c* schematically show an example of AC signals in an embodiment of an optical modulator, FIG. 8*a* schematically shows an example of an embodiment of an optical modulator, FIG. 8*b* schematically shows an example of AC signals in an embodiment of an optical modulator, FIG. 9*a* schematically shows an example of an embodiment of an optical modulator, FIG. 9*b* schematically shows an example of an embodiment of an optical modulator, FIG. 9*c* schematically shows an example of an embodiment of a car, FIG. 10 schematically shows an example of a method of controlling an electrophoretic optical modulator with asymmetric electrode driving, FIG. 11*a* schematically shows a computer readable medium having a writable part comprising a computer program according to an embodiment, FIG. 11*b* schematically shows a representation of a processor system according to an embodiment.
Figure 5B:
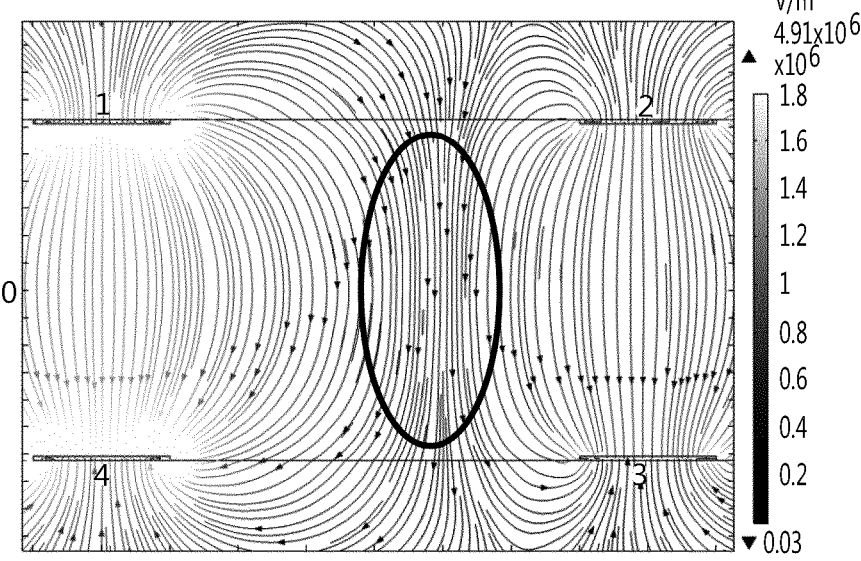

FIGS. 5a-5b show an example of an electric field in an embodiment of an optical modulator. The electric field diagrams in FIGS. 5a-5b are the same as in FIGS. 4a.1-4b.1. Shown in the FIGS. 5a-5c is a low-electric field region schematically indicated by an oval. The electric field in the ovals is about 1.5*10^6 V/m. Note that low-electric field region moved to the right, when comparing FIGS. 5a and 5b. For example, the center of the low-electric field region, e.g., a center of gravity or a center weighted by electric field strength moved to the right, in this case parallel to the substrates. Note also that the dead regions outside the optical layer moved to the right.

FIGS. 6a-6b schematically shows an example of AC signals in an embodiment of an optical modulator arranged for a diagonal drive. Diagonal drive may be used for closing of the panel. Diagonal drive may be used to mix the particles in the optical layer. Mixing particles is advantageous for the lifespan of the panel. Mixing particles may also be used as a phase during closing of the panel. For example, a period of diagonal driving as in FIGS. 6a and 6b may be followed by driving as in FIGS. 2a-2c. Diagonal driving may also be used to reach a gray in between a closed and open panel.

FIGS. 6a.1, and 6b.1 show an example of an electric field in an embodiment of an optical modulator. The electric field is shown in the same plane as shown in FIG. 1b. FIGS. 6a.2, and 6b.2 schematically show an example of AC signals corresponding to the electric field diagram.

In FIG. 6a.2, the AC signals applied to diagonal electrode pair 1 and 3 and to diagonal electrode pair 2 and 4 is equal. In FIG. 6a.2, the AC signals applied to neighboring electrode pair 1 and 2 and to neighboring electrode pair 3 and 4 are equal except for a phase shift, in this case a phase shift over 180 degrees. There is a dead region halfway between electrodes 1, 2, 3, and 4. In the dead region the electric field is substantially null.

FIG. 6b.2 show an asymmetry introduced in the driving of the panel. In FIG. 6b.2, the AC signals applied to diagonal electrode pair 1 and 3 and to diagonal electrode pair 2 and 4 are equal except for scaling. For example, the driving in FIG. 6b.2 can be obtained from the driving in FIG. 6a.2 by scaling down the driving on electrodes 1 and 2, e.g., by scaling down the driving of one of electrodes in a pair of diagonal electrodes. In FIG. 6b.2, the AC signals applied to neighboring electrode pair 1 and 2 and to neighboring electrode pair 3 and 4 are equal except for a phase shift, in this case a phase shift over 180 degrees. Note that all signals applied to electrodes on one substrate, in this case the upper substrate, have been scaled down. For example, in an embodiment signals applied to one of the two substrates has a lower amplitude than signals applied to the other of the two substrates. As a result the dead region in FIG. 6a.1 has moved up in FIG. 6b.1. In this case, the dead region moved orthogonal to the substrate, though non-orthogonal movement is possible as well, e.g., by scaling signals 1 and 2 in FIG. 6b.2 a different amount.

In an embodiment, the controller is configured for a closing operation of the optical modulator, in the closing operation the AC signal applied to opposite electrodes on opposite substrates are scaled with respect to each other, the controller modulating the scaling thus moving the low-electric field region. In an embodiment, the AC signal applied to neighboring electrodes on the same substrates are phase shifted with respect to each other.

In an embodiment, the controller is configured for an opening operation of the optical modulator, in the closing operation the AC signal applied to neighboring electrodes on the same substrates are scaled with respect to each other, the controller modulating the scaling thus moving the low-electric field region. In an embodiment, the AC signal applied to opposite electrodes on opposite substrates are phase shifted with respect to each other.

In an embodiment, asymmetric driving comprises applying a different amplitude signal to at least some of the electrodes in the optical modulator. Other asymmetric driving type is also possible, e.g., asymmetric driving with different frequencies. For example, the same amplitudes may be used on all electrodes, but the frequencies may be varied between at least some pairs. Frequency can also be varied in addition to amplitude.

In an embodiment, the optical modulator is an electrophoretic modulator, wherein particles are moved due to the electrophoretic effect. In an embodiment, a high frequency component may be added to the signals. For example, in an embodiment, the electrophoretic driving uses frequencies of, say, up to 100 Hz. Using only comparatively low frequency signals is sufficient to obtain efficient driving of the optical modulator. In an embodiment, at least some of the AC signals comprise a high frequency component. For example, in an embodiment, the high frequency component may have a frequency of at least 500 Hz, or at least 750 Hz, preferably at least 1 kHz. The high frequency component causes particles to move due to the dielectrophoretic effect in addition to the electrophoretic effect.

Figures 7A, 7B:
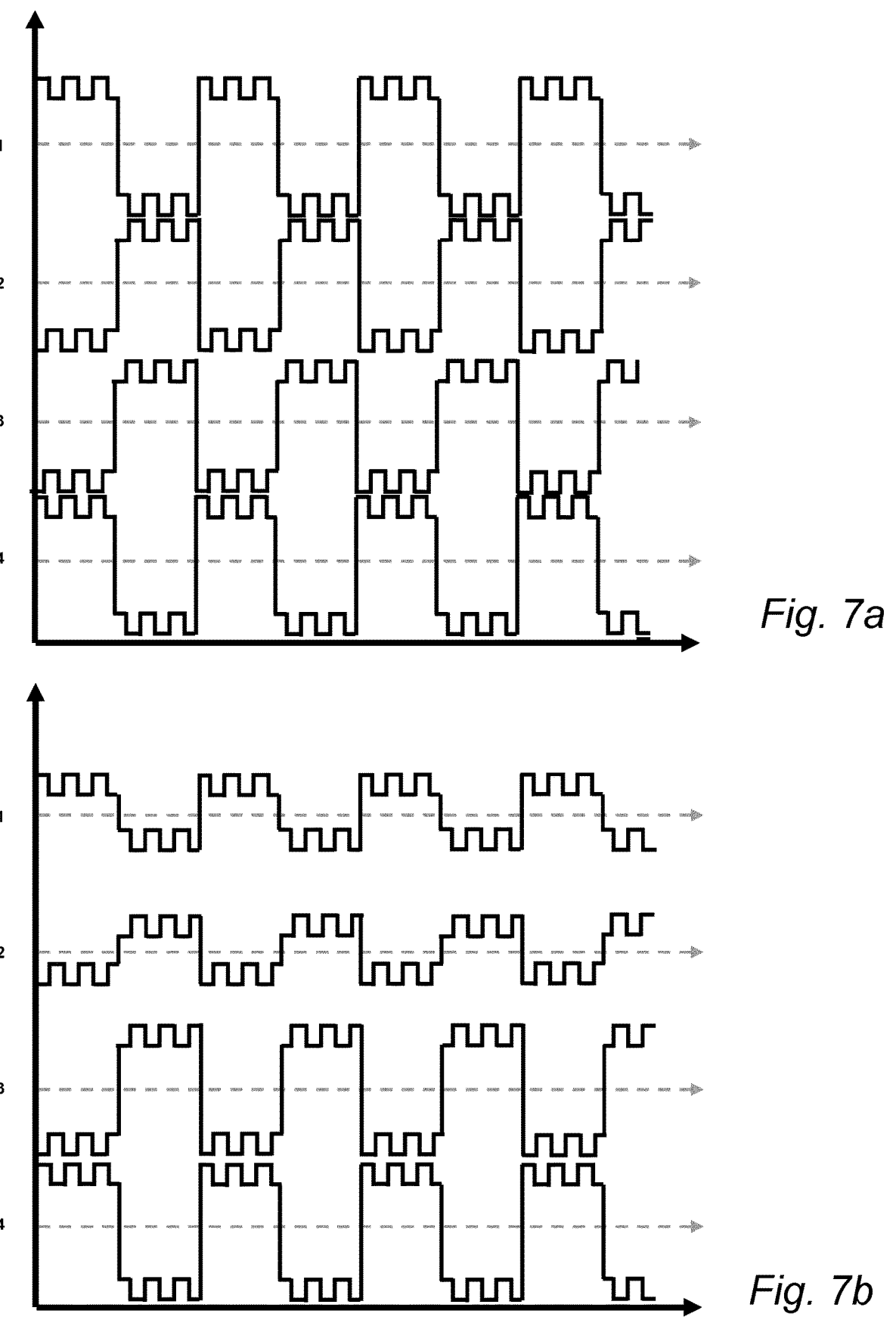
Figure 7C:
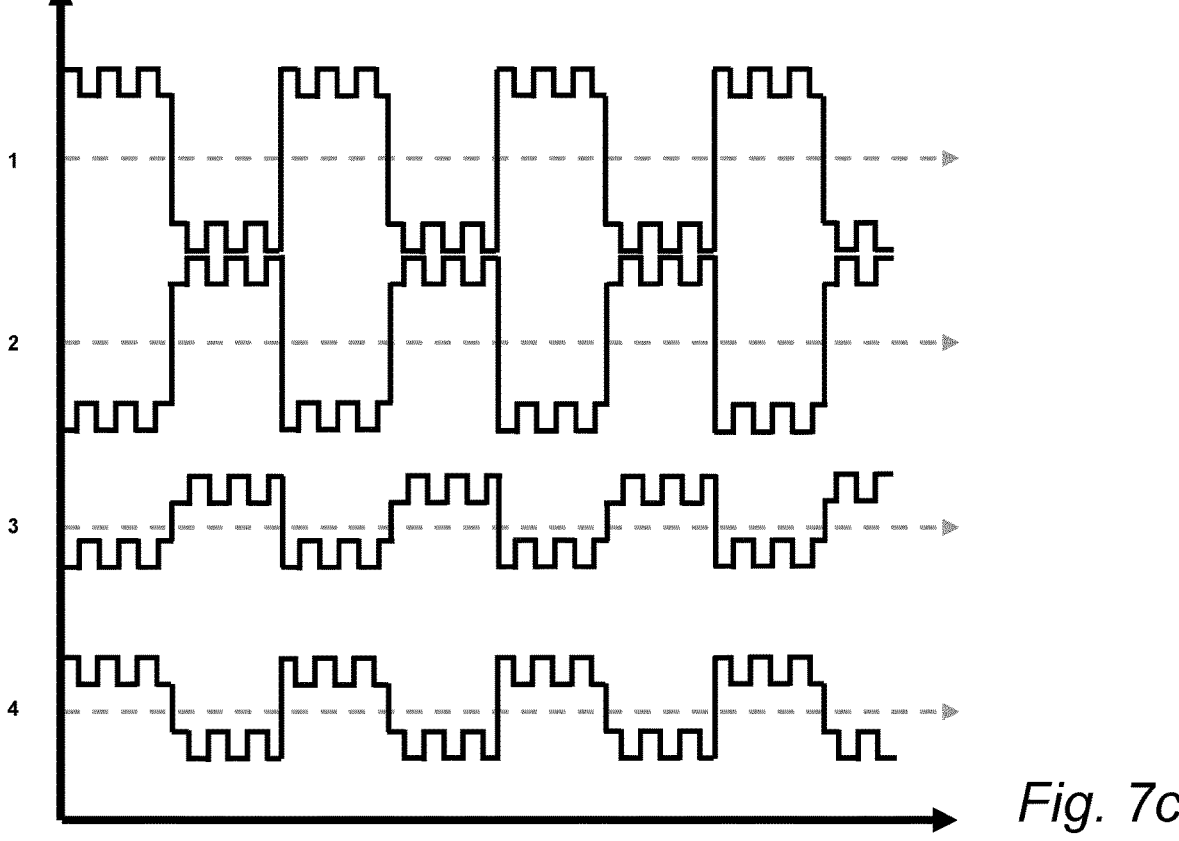

The high frequency component may be removed when a target gray level is reached. Doing so save energy, and reduced heat up of the optical modulator. A low pass filter may be applied to the AC signals. For example, the low-pass filter may be set to a threshold of just above the frequency of the high frequency component. FIGS. 7a-7c schematically show an example of AC signals in an embodiment of an optical modulator. FIGS. 7a-7c correspond to FIGS. 2a.2, 2b.2, 2c.2 with a schematic HF component. FIGS. 4a.2, 4b.2, 6a.2 and 6b.2 could likewise be enhanced with an HF component.

Figure 8A:
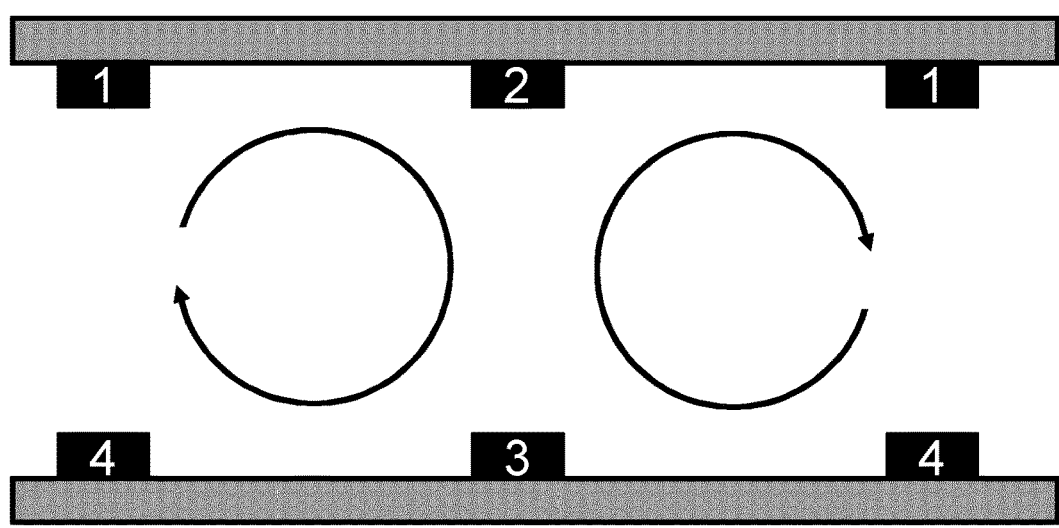
Figure 8B:
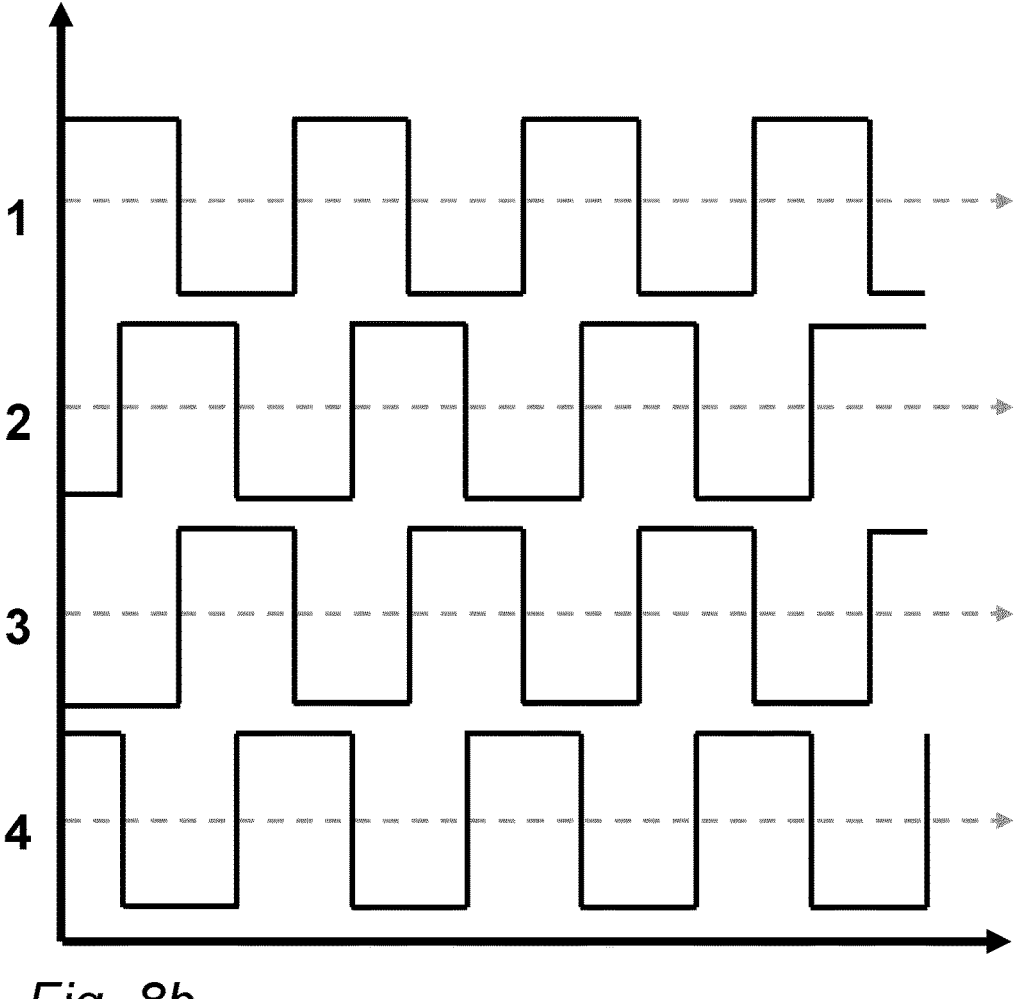

FIG. 8a schematically shows an example of an embodiment of an optical modulator. FIG. 8b schematically shows an example of AC signals in an embodiment of an optical modulator. The optical modulator shown in other figures use two phases for all signals. This is not necessary however, and in fact, using different phases for more than 2 signals may b advantageous. For example, FIG. 8b shows a first signal on electrode. A second signal on the neighboring electrode 2 is the same but is shifted over a first phase shift. A third signal on electrode 3 is the same as the electrode 2 signal, but is phase shifted over a second phase shift. The signal for electrode 4 is phase shifted over a third phase shift compared to signal 3. The first signal is the same as the fourth signal shifted over a fourth phase shift. The four phase shifts could all be equal to 360/4=90 degrees, but this is not necessary. In an embodiment, the phase differences are varied over time.

An advantage of having increasing phase shifts for the four signals is that particles are kept in the cell gap better. As a result, a given transparency or lack thereof can be maintained with lower power. In FIG. 8b the amplitudes of the four signals as shown are equal, but the amplitudes could be varied as in an embodiment.

Using different phase for more than two signals may be used to trap particles in the gap between neighboring electrodes; this is especially advantageously when closing the panel, and in maintaining a gray level.

For example, taking the signal on electrode 4 as a reference, signal 1 may have phase shift and an amplitude scaling, signal 2 may have a further phase shift and an amplitude scaling (possibly the same scaling), signal 3 may have a further phase shift without the amplitude scaling.

Figure 9A:
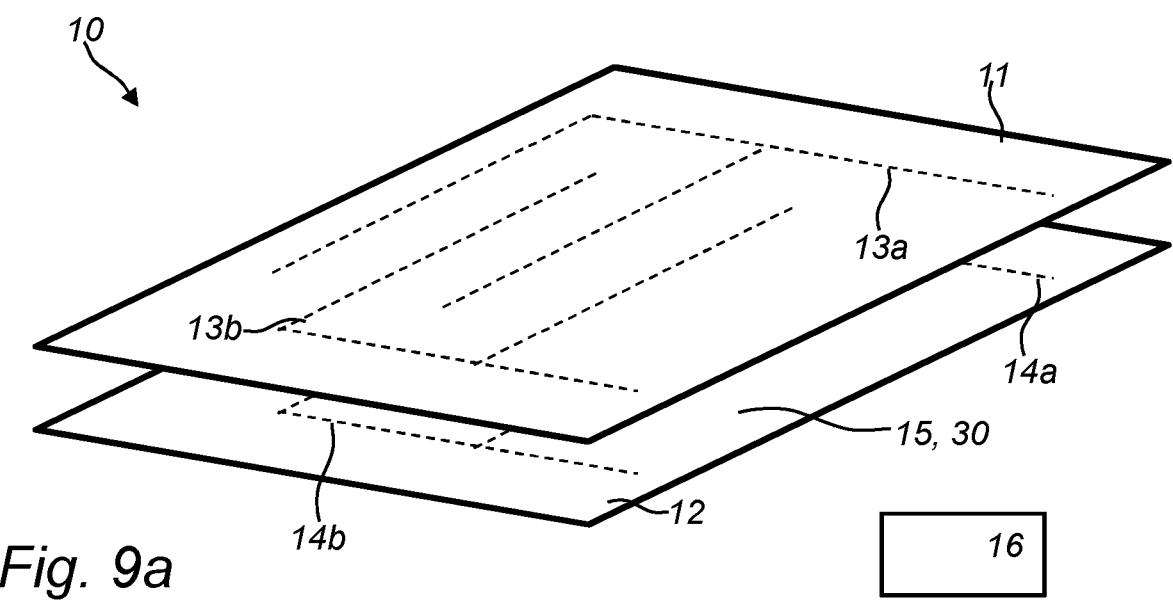

FIG. 9*a* schematically shows an embodiment of a light modulator 10, which may be applied in smart glazing. A light modulator is an example of an optical modulator.

Reference is made to patent application PCT/EP2020/052379, which is included herein by reference; this application comprises advantageous designs for light modulator, which may be further improved, e.g., by including electrodes, building blocks, and/or substrates as explained herein.

Light modulator 10 can be switched electronically between a transparent state and a non-transparent state and vice versa, or between a reflective state and a non-reflective state and vice versa. Light modulator 10 comprises a first substrate 11 and a second substrate 12 arranged opposite to each other. On an inner-side of first substrate 11 at least two electrodes are applied: shown are electrodes 13*a*, 13*b*. These at least two electrodes are together referred to as electrodes 13. On an inner-side of second substrate 12 at least two electrodes are applied: shown are electrodes 14*a*, 14*b*. These at least two electrodes are together referred to as electrodes 14. The configuration of electrodes is interdigitated, but may otherwise be greatly varied. In particular, it is not necessary that main lines of the electrodes stretch across the substrate in parallel.

A fluid 15 is provided in between said substrate. The fluid comprises particles 30, e.g., nanoparticles and/or microparticles, wherein the particles are electrically charged or chargeable. For example, particles may carry a charge on their surface intrinsically. For example, the particle may be surrounded by a charged molecule.

The electrodes are arranged for driving particles 30 to move towards or away from electrodes, depending on the electric field applied. The optical properties, in particular the transparency or reflectivity of the light modulator depends on the location of particles 30 in the fluid. For example, a connection may be provided for applying an electro-magnetic field to the electrodes.

In an example, substrate 11 and substrate 12 may be optically transparent outside of the electrodes, typically >95% transparent at relevant wavelengths, such as >99% transparent. Taking electrodes into account, transparency can be much lower, e.g., 70%. The term "optical" may relate to wavelengths visible to a human eye (about 380 nm-about 750 nm), where applicable, and may relate to a broader range of wavelengths, including infrared (about 750 nm-1 μm) and ultraviolet (about 10 nm-380 nm), and sub-selections thereof, where applicable. In an exemplary embodiment of the light modulator a substrate material is selected from glass, and polymer. A transparent material may be used for electrodes as well. In an embodiment of an optical modulator, only of the substrates 11 and substrate 12 is transparent.

In another example, one substrate, such as a bottom substrate 12, may be reflective or partially reflective, while the top substrate 11 is transparent. The optical properties, in particular the reflectivity of the light modulator depends on the location of particles 30 in the fluid. When the panel is in the open state (vertical drive), the particles will mostly be located between opposite electrodes of the two substrates, such that incident light can pass through the transparent top substrate and the optical layer relatively unhindered, and is reflected or partially reflected on the bottom substrate.

The distance between the first and second substrate is typically smaller than 30 μm, such as 15 μm. In an exemplary embodiment of the light modulator a distance between the first and second substrate is smaller than 500 μm, preferably smaller than 200 μm, preferably less than 100 μm, even more preferably less than 50 μm, such as less than 30 μm.

In an example the modulator may be provided in a flexible polymer, and the remainder of the device may be provided in glass. The glass may be rigid glass or flexible glass. If required, a protection layer may be provided on the substrate. If more than one color is provided, more than one layer of flexible polymer may be provided. The polymer may be polyethylene naphthalate (PEN), polyethylene terephthalate (PET) (optionally having a SiN layer), polyethylene (PE), etc. In a further example the device may be provided in at least one flexible polymer. As such the modulator may be attached to any surface, such as by using an adhesive.

Particles 30 may be adapted to absorb light and therewith preventing certain wavelengths from passing through. Particles 30 may reflect light; for example the reflecting may be specular, diffusive or in between. A particle may absorb some wavelengths, and reflect others. Particles may also or instead emit light, e.g., using phosphorescence, fluorescence, or the like. Even the fluid may emit light, which emittance is modulated by changing the location of particles.

In an exemplary embodiment of the light modulator a size of the nanoparticles is from 20-1000 nm, preferably 20-300 nm, more preferably smaller than 200 nm. In an exemplary embodiment of the light modulator the nanoparticles/microparticles may comprise a coating and/or a pigment, and preferably comprising a core. In an exemplary embodiment of the light modulator the coating of the particles is made from a material selected from conducting and semiconducting materials.

In an exemplary embodiment of the light modulator the particles are adapted to absorb light with a wavelength of 10 nm-1 mm, such as 400-800 nm, 700 nm-1 μm, and 10-400 nm, and/or are adapted to absorb a part of the light with a wavelength-range falling within 10 nm-1 mm (filter), and combinations thereof.

In an exemplary embodiment of the light modulator the particles are electrically charged or chargeable. For example, a charge on the particles may be 0.1e to 10e per particle (5*10-7-0.1 C/m2).

In an exemplary embodiment of the light modulator the fluid is present in an amount of 1-1000 g/m$^2$, preferably 2-75 g/m$^2$, more preferably 20-50 g/m$^2$, such as 30-40 g/m$^2$. It is a big advantage that with the present layout much less fluid, and likewise particles, can be used.

In an exemplary embodiment of the light modulator the particles are present in an amount of 0.01-70 g/m$^2$, preferably 0.02-10 g/m$^2$, such as 0.1-3 g/m2.

In an exemplary embodiment of the light modulator the particles have a color selected from cyan, magenta, and yellow, and from black and white, and combinations thereof.

In an exemplary embodiment of the light modulator the fluid comprises one or more of a surfactant, an emulsifier, a polar compound, and a compound capable of forming a hydrogen bond.

Fluid 15 may be an apolar fluid with a dielectric constant less than 15. In an exemplary embodiment of the light modulator the fluid has a relative permittivity r of less than 100, preferably less than 10, such as less than 5. In an exemplary embodiment of the light modulator, fluid 15 has a dynamic viscosity of above 10 mPa·s.

Electrodes 13*a*, 13*b* and electrodes 14*a*, 14*b* are in fluidic contact with the fluid. The fluid may be in direct contact the electrodes, or indirectly, e.g., the fluid may contact a second medium with the electrode, such as through a porous layer. In an embodiment, the electrodes cover about 1-30% of the substrate surface. In an embodiment, the electrodes comprise an electrically conducting material with a resistivity of less than 100 n□m (at 273K; for comparison typically used ITO has 105 n□m), which is similar to an electrical conductivity >1*107 S/m at 20° C.

In an embodiment of the light modulator electrodes comprise copper, silver, gold, aluminum, graphene, titanium, indium, and combinations thereof, preferably copper. The electrodes may be in the form of wires, e.g., microwires, embedded in a polymer-based substrate; for example, copper microwires.

A connection for applying an electro-magnetic field to the electrodes, wherein the applied electro-magnetic field to the electrodes provides movement of the nano- and microparticles from a first electrode to a second electrode and vice versa. A connection for applying an electro-magnetic field to the electrodes may be provided. For example, in an exemplary embodiment of the light modulator an electrical current is between −100–+100 μA, preferably −30–+30 μA, more preferably −25–+25 μA. For example, a power provider may be in electrical connection with the at least two electrodes. The power provider may be adapted to provide a waveform power. At least one of amplitude, frequency, and phase may be adaptable to provide different states in the light modulator. For example, the aspects of the power may be adapted by a controller.

Light modulator 10 may comprise one or more segments, a segment being a single optically switchable entity, which may vary in size. The substrates enclose a volume, which may be a segment, at least partly.

The present device may comprise a driver circuit for changing appearance of (individual) segments by applying an electro-magnetic field. As such also the appearance of the light modulator, or one or more parts thereof, may be changed. For example, a segment may have an area of at least 1 mm2. The present design allows for stacking to allow for more colors; e.g., for full color applications a stack of two or three modulators could provide most or all colors, respectively.

Having one or more segments allows the light modulator to be controlled locally; this is advantageous for some applications, but not necessary. For smart glazing a light modulator may be used with or without segments. For example, applied in smart glazing, transparency or reflectivity may be controlled locally, e.g., to block a sun-patch without reducing transparency or reflectivity in the whole window. Segments may be relatively large, e.g., having a diameter of at least 1 mm, or at least 1 cm, etc.

In an exemplary embodiment of the light modulator substrates (11,12) are aligned, and/or electrodes (13,14) are aligned. For example, electrodes 13*a*, 13*b* and electrodes 14*a*, 14*b* may be aligned to be opposite each other. In aligned substrates, electrodes on different substrates fall behind each other when viewed in a direction orthogonal to the substrates. When the light modulator is disassembled, and the substrates are both arranged with electrodes face-up, then the electrode patterns are each other's mirror image.

Aligning substrates may increase the maximum transparency or reflectivity of the light modulator; on the other hand, when selecting a light modulator for more criteria than the range of transparency or reflectivity, etc., it may be better not to align or not fully align the two substrates. Light modulators can be stacked. For example, two stacked light modulators can be made from three substrates, wherein the middles one has electrodes on both its surfaces. In an embodiment of the light modulator optionally at least one substrate 11,12 of a first light modulator is the same as a substrate 11,12 of at least one second light modulator. For stacked modulators, alignment may also increase maximum transparency or reflectivity, but is may be detrimental to other considerations, e.g., diffractions.

Figure 9B:
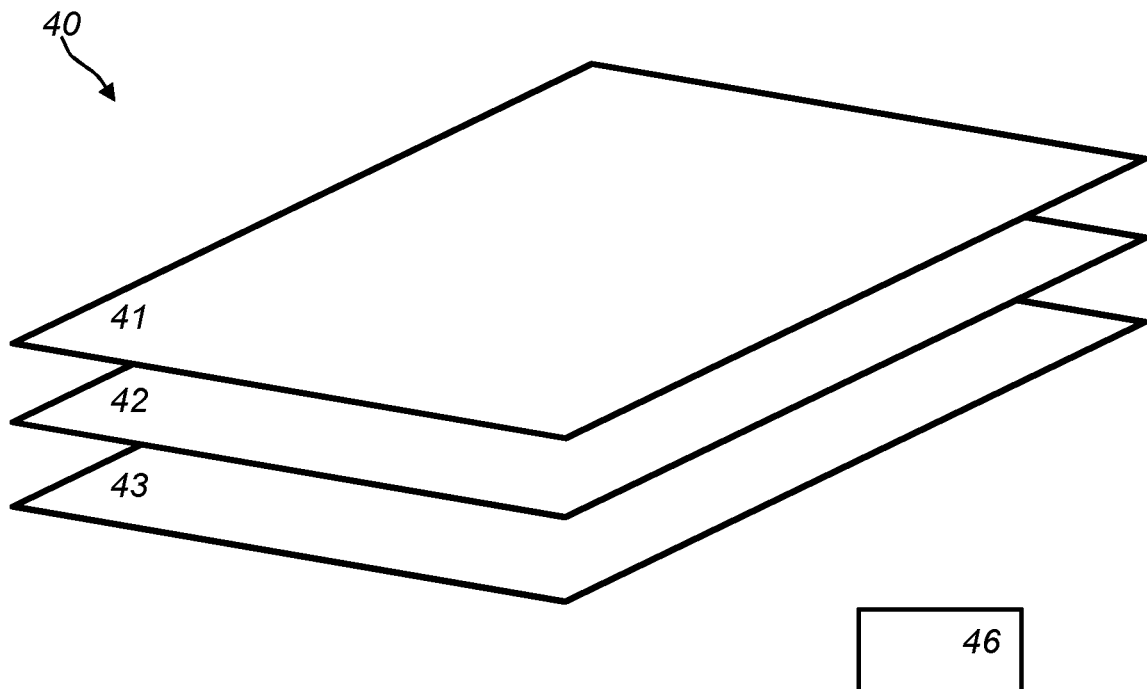

FIG. 9*b* schematically shows an example of an embodiment of a light modulator 40. Light modulator 40 is similar to light modulator 10, except that it comprises multiple optical layers; in the example as shown two optical layers. There may be more than two optical layers. Each optical layer is arranged between two substrates. Light modulator 40 can be regarded as a stack of two-substrate light modulators as in FIG. 9*a*. As shown, light modulator 40 comprises three substrates: first substrate 41, second substrate 42 and third substrate 43. Between substrates 41 and 42 is an optical layer, and between substrates 42 and 43 is an optical layer. The optical layers may be similar to those in light modulator 10. A controller 46 is configured to control electrical current on the electrodes of the substrates. For example, in FIG. 9*b*, controller 46 may be electrically connected to at least 4 times 2 equals 8 electrodes.

Interestingly, the particles in the multiple optical layers may be different so that the multiple layers may be used to control more optical properties of the light modulator. For example, particles in different optical layers may absorb or reflect at different wavelengths, e.g., may have a different color. This can be used to create different colors and/or different color intensities on the panel by controller 46. For example, a four-substrate panel may have three optical layers with different color particles, e.g., cyan, yellow and magenta, respectively. By controlling the transparency or reflectivity for the different colors a wide color spectrum may be created.

The surfaces of the substrates that face another substrate may be supplied with two or more patterns, e.g., as in an embodiment. For example, the outer substrates 41 and 43 may receive electrodes only on an inner side, while the inner substrate, e.g., substrate 42, may have electrodes on both sides.

Substrates 41 and 42 may together be regarded as an embodiment of a light modulator. Likewise, substrates 42 and 43 may together be regarded as an embodiment of a light modulator.

Figure 9C:
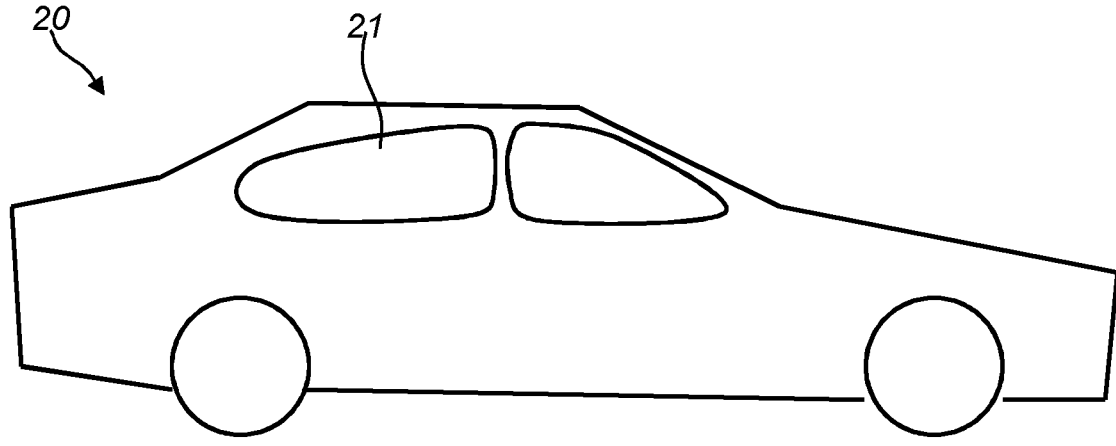

FIG. 9*c* schematically shows an example of an embodiment of a car 20 having smart glazing for windows 21. This is a particularly advantageous embodiment, since while driving the level of incident lighting can change often and rapidly. Using smart glazing in a car has the advantage that light levels can be maintained as a constant level by adjusting the transparency of the car windows. Faster and/or more uniform transition between optical states, e.g., faster transition towards non-transparency is particularly advantageous in a car, as it reduces driver distraction during transition. Car 20 may comprise a controller configured for controlling the transparency or reflectivity of windows 21.

The smart glazing can also be used in other glazing applications, especially, were the amount of incident light is variable, e.g., buildings, offices, houses, green houses, skylights. Skylights are windows arranged in the ceiling to allow sunlight to enter the room.

The light modulator may have two optical states, e.g., a transparent state and a non-transparent state, or a reflective state and a non-reflective state. The light modulator, e.g., light modulator 10 or light modulator 40 may be configured to > switch to the second optical state, e.g., the non-transparent state or to the non-reflective state by creating an alternating voltage on at least one of the first and second substrates, applying an alternating current between at least a first electrode and a second electrode on the first substrate and/or between a first electrode and a second electrode on the second substrate, and
>
> switch to the first optical state, e.g., the transparent state or to the reflective state by creating an alternating voltage between the first and second substrate, applying an alternating current between a first electrode on the first substrate and a first electrode on the second substrate, and/or between a second electrode on the first substrate and a second electrode on the second substrate.

The electrode pattern on the first substrate is arranged at least in part in the same pattern as a second electrode on the second substrate. Typically, the electrodes oppose each other, but the pattern of the first electrode and second electrode may also be shifted with respect to each other.

A protective coating may be provided on at least a part of the inner surface area of at least one of the first substrate and the second substrate is provided.

A driving signal applied to driving electrodes typically has a varying voltage. For example, a power provider may be operated at an AC frequency for switching to a transparent state or to a non-transparent state. Such a signal may have a frequency between, say, 1-1000 Hz. A balanced electrolysis current may be obtained by continuously switching the polarity of oppositely charged electrodes on the first and on the second substrates and/or between the first and the second substrates.

Figure 10:
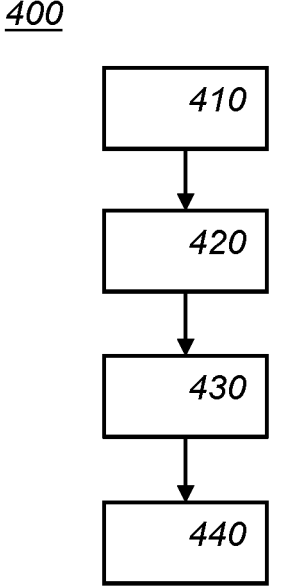

In an embodiment, a method of controlling an electrophoretic optical modulator with asymmetric electrode driving, comprises > applying an electric AC signal to the multiple electrodes to obtain an electric field between the multiple electrodes providing electrophoretic movement of the particles towards or from one of the multiple electrodes causing modulation of the optical properties of the light modulator,
>
> modulating the amplitudes of the electric AC signals applied to the multiple electrodes on the substrates causing a low-electric field region where the electric field is reduced to move with respect to the electrodes. For example, FIG. 10 schematically shows an example of a method 400 of controlling an electrophoretic optical modulator with asymmetric electrode driving. Method 400 comprises:
>
> receiving (410) a command to increase or decrease panel transparency,
>
> selecting a set of AC signals (420) depending on the received command,
>
> periodically vary (430) relative amplitudes in the set of AC signals,
>
> apply (440) the signal to electrodes in the panel, Many different ways of executing methods according to an embodiment are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, steps 430 and 440 may be executed, at least partially, in parallel. Moreover, a given step may not have finished completely before a next step is started.

Embodiments of the method may be executed using software, which comprises instructions for causing a processor system to perform method 400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 11A:
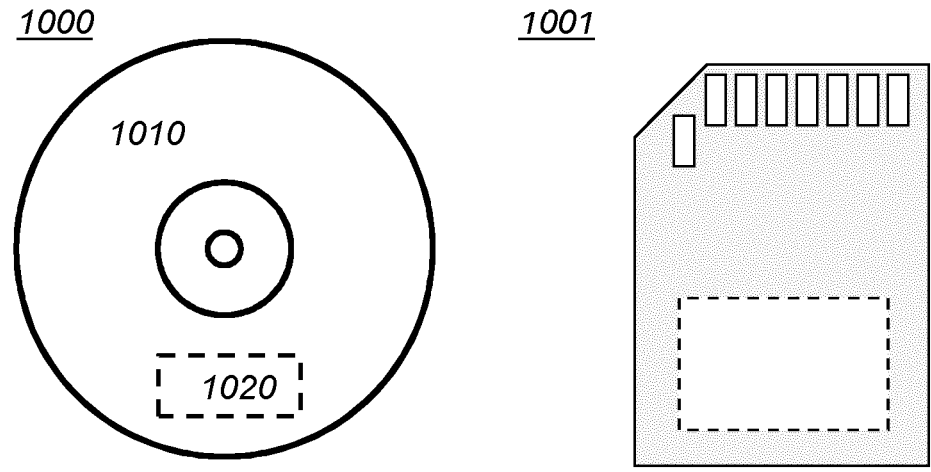

FIG. 11a shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform a method according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of electrophoretic control.

Figure 11B:
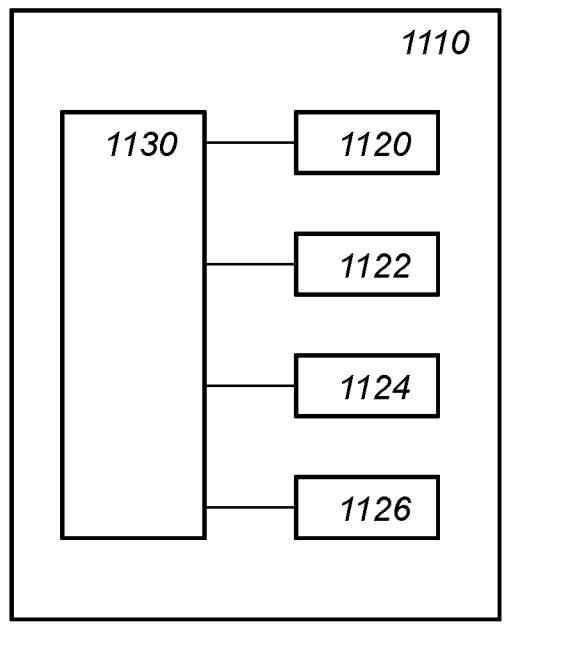

FIG. 11b shows in a schematic representation of a processor system 1140 according to an embodiment. The processor system comprises one or more integrated circuits 1110. The architecture of the one or more integrated circuits 1110 is schematically shown in FIG. 11b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the electrophoretic controller or the optical modulator may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex MO. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims, references in parentheses refer to reference signs in drawings of exemplifying embodiments or to formulas of embodiments, thus increasing the intelligibility of the claim. These references shall not be construed as limiting the claim.

The invention claimed is:

1. An electrophoretic optical modulator with asymmetric electrode driving, the optical modulator comprising at least a first substrate and a second substrate arranged opposite thereto, an optical layer arranged between the first and second substrates that comprises a fluid comprising particles, the particles being electrically charged or chargeable, multiple interdigitated electrodes being arranged across each of the first and second substrate, and a controller configured to apply an electric AC signal to the multiple electrodes to obtain an electric field between the multiple electrodes providing electrophoretic movement of the particles towards or from one of the multiple electrodes causing modulation of the optical properties of the light modulator, wherein the controller is configured to modulate the amplitudes of the electric AC signals applied to the multiple electrodes on the substrates, wherein modulating the amplitudes causes a low-electric field region to move with respect to the electrodes, wherein the low-electric field region is a region where particle movement with respect to the electrodes is static, or modulating the amplitudes causes a low-electric field region to move with respect to the electrodes, wherein an electric field strength in the low-electric field region of the optical layer is 25% or less than the maximal electric field strength in the optical layer.

2. The optical modulator as in claim 1, wherein the controller is configured for a closing operation of the optical modulator, the low-electric field region moving between two opposite electrodes on opposite substrates.

3. The optical modulator as in claim 1, wherein the controller is configured for an opening operation of the optical modulator, the low-electric field region moving parallel to the substrates.

4. The optical modulator as in claim 1, wherein the amplitudes are modulated until a target gray level is reached, after which the controller applies an electric maintenance signals to the multiple electrodes on the substrates to maintain the gray level of the optical modulator.

5. The optical modulator as in claim 1, wherein a first AC signal applied to a first electrode is scaled with respect to a second AC signal applied to a second electrode.

6. The optical modulator according to claim 1, wherein a scaling between two AC signals applied to two electrodes cycles between a lower scaling factor and an upper scaling factor.

7. The optical modulator as in claim 6, wherein the first AC signal has a constant amplitude, and the second AC signal is scaled with respect to the first AC signal.

8. The optical modulator according to claim 1, wherein a scaling between two AC signals applied to two electrodes is modulated to randomize the position of the low-electric field region.

9. The optical modulator according to claim 1, wherein the controller is configured for a closing operation, wherein the ratio of amplitudes in a pair of signals applied to a pair of opposite electrodes on opposite substrates varies, and/or an opening operation, wherein the ratio of amplitudes in a pair of signals applied to a pair of neighboring electrodes on the same substrates varies.

10. The optical modulator according to claim 1, wherein a first AC signal applied to a first electrode is scaled with respect to a second AC signal applied to a second electrode, wherein the lower amplitude of the first and second AC signal is at most 70%, 50%, 45%, 40%, 30% of the higher amplitude.

11. The optical modulator according to claim 1, wherein at least one of the AC signals has a high frequency component, having a frequency of at least 500 Hz, or 750 Hz, preferably at least 1 kHz, and a lower frequency component, having a frequency of at most 100 Hz.

12. The optical modulator according to claim 11, wherein the high frequency component is removed when a target gray level is reached.

13. The optical modulator according to claim 1, wherein a low pass filter is applied to the AC signals.

14. The optical modulator according to claim 1, wherein the particles in the fluid move subject to an electrophoretic force and to a dielectrophoretic force.

15. The optical modulator according to claim 1, wherein the first substrate comprise a first electrode and a neighboring second electrode, and the second substrate comprise a third electrode and a neighboring fourth electrode, the first and fourth electrodes being opposite each other and the second and third being opposite each other, the controller being configured to use a first phase for the first electrode, an increased phase for the second electrode, a further increased phase for the third electrode and a yet further increased phase for the fourth electrode.

16. An electrophoretic optical modulator according to claim 1, wherein the low-electric field region is a dead region where the electric field is absent, the controller being configured to move the dead region with respect to the electrodes.

17. An electrophoretic optical modulator according to claim 1, wherein
   the electric field strength in the low-electric field region of the optical layer is 15% or less, 10% or less, or 1% or less, compared to the maximal electric field in the optical layer, and/or
   the electric field strength in the low-electric field region of the optical layer is less than $2*10^6$ V/m, less than $1*10^6$ V/m, or less than $1*10^5$ V/m, and/or
   the electric field strength in the low-electric field region is at most at most 15%, or at most 10% more than the minimal electric field strength in the optical layer.

18. A controller configured for controlling asymmetric AC signals for an electrophoretic optical modulator, the optical modulator comprising at least a first substrate and a second substrate arranged opposite thereto, an optical layer arranged between the first and second substrates that comprises a fluid comprising particles, the particles being electrically charged or chargeable, multiple interdigitated electrodes being arranged across each of the first and second substrate, the controller being configured to apply electric AC signals to the multiple electrodes to obtain an electric field between the multiple electrodes providing electrophoretic movement of the particles towards or from one of the multiple electrodes causing modulation of the optical properties of the light modulator, wherein the controller is configured to modulate the amplitudes of the electric AC signals applied to the multiple electrodes on the substrates wherein
   modulating the amplitudes causes a low-electric field region to move with respect to the electrodes, wherein the low-electric field region is a region where particle movement with respect to the electrodes is static, or
   modulating the amplitudes causes a low-electric field region to move with respect to the electrodes, wherein an electric field strength in the low-electric field region of the optical layer is 25% or less than the maximal electric field strength in the optical layer.

19. A method of controlling an electrophoretic optical modulator with asymmetric electrode driving, the optical modulator comprising at least a first substrate and a second substrate arranged opposite thereto, an optical layer arranged between the first and second substrates that comprises a fluid comprising particles, the particles being electrically charged or chargeable, multiple interdigitated electrodes being arranged across each of the first and second substrate, the method comprising:
   causing electric AC signals to apply to the multiple electrodes to obtain an electric field between the multiple electrodes providing electrophoretic movement of the particles towards or from one of the multiple electrodes causing modulation of the optical properties of the light modulator,
   modulating the amplitudes of the electric AC signals applied to the multiple electrodes on the substrates wherein
      modulating the amplitudes causes a low-electric field region to move with respect to the electrodes, wherein the low-electric field region is a region where particle movement with respect to the electrodes is static, or
      modulating the amplitudes causes a low-electric field region to move with respect to the electrodes, wherein an electric field strength in the low-electric field region of the optical layer is 25% or less than the maximal electric field strength in the optical layer.

20. A transitory or non-transitory computer readable medium comprising data representing instructions, which when executed by a processor system, cause the processor system to perform the method according to claim 19.

* * * * *